United States Patent
Sato

(10) Patent No.: US 7,259,939 B2
(45) Date of Patent: Aug. 21, 2007

(54) THIN-FILM MAGNETIC HEAD INCLUDING A TOROIDAL COIL LAYER AND CONNECTING LAYER FORMED BETWEEN A FIRST AND SECOND MAGNETIC CORES DISPOSED AT A BACK SIDE OF THE TOROIDAL COIL LAYER

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 435 days.

(21) Appl. No.: 10/852,442

(22) Filed: May 24, 2004

(65) Prior Publication Data

US 2004/0246629 A1    Dec. 9, 2004

(30) Foreign Application Priority Data

Jun. 4, 2003    (JP) ............................. 2003-158764

(51) Int. Cl.
*G11B 5/127*    (2006.01)
*G11B 5/39*    (2006.01)

(52) U.S. Cl. ........................................ 360/317; 360/126
(58) Field of Classification Search ...................... None
See application file for complete search history.

(56) References Cited

U.S. PATENT DOCUMENTS 5,995,342 A * 11/1999 Cohen et al. ............... 360/126

FOREIGN PATENT DOCUMENTS

| JP | 07-282419 | 10/1995 |
|---|---|---|
| JP | 2001-076313 | 3/2001 |
| JP | 2001-093113 | 4/2001 |
| JP | 2001-126216 | 5/2001 |
| JP | 2001-236614 | 8/2001 |
| JP | 2001209909 A * | 8/2001 |
| JP | 2001236614 A * | 8/2001 |

* cited by examiner

*Primary Examiner*—David Davis
(74) *Attorney, Agent, or Firm*—Brinks Hofer Gilson & Lione

(57) ABSTRACT

A thin-film magnetic head includes a first magnetic core, a second magnetic core, a connecting layer which connects the first magnetic core and the second magnetic core, a toroidal coil layer, and a shielding layer. The connecting layer extends in the height direction so as to face the back side in the height direction of the shielding layer. Alternatively, the width in the track width direction of the connecting layer is larger than the width in the track width direction of the toroidal coil layer. Consequently, the volume of the connecting layer is increased, and thereby the heat capacity is increased. Heat generated in the thin-film magnetic head can be properly dissipated via the connecting layer, and an increase in the temperature inside the thin-film magnetic head can be prevented. As a result, protrusion of the thin-film magnetic head due to thermal expansion can be prevented.

7 Claims, 18 Drawing Sheets

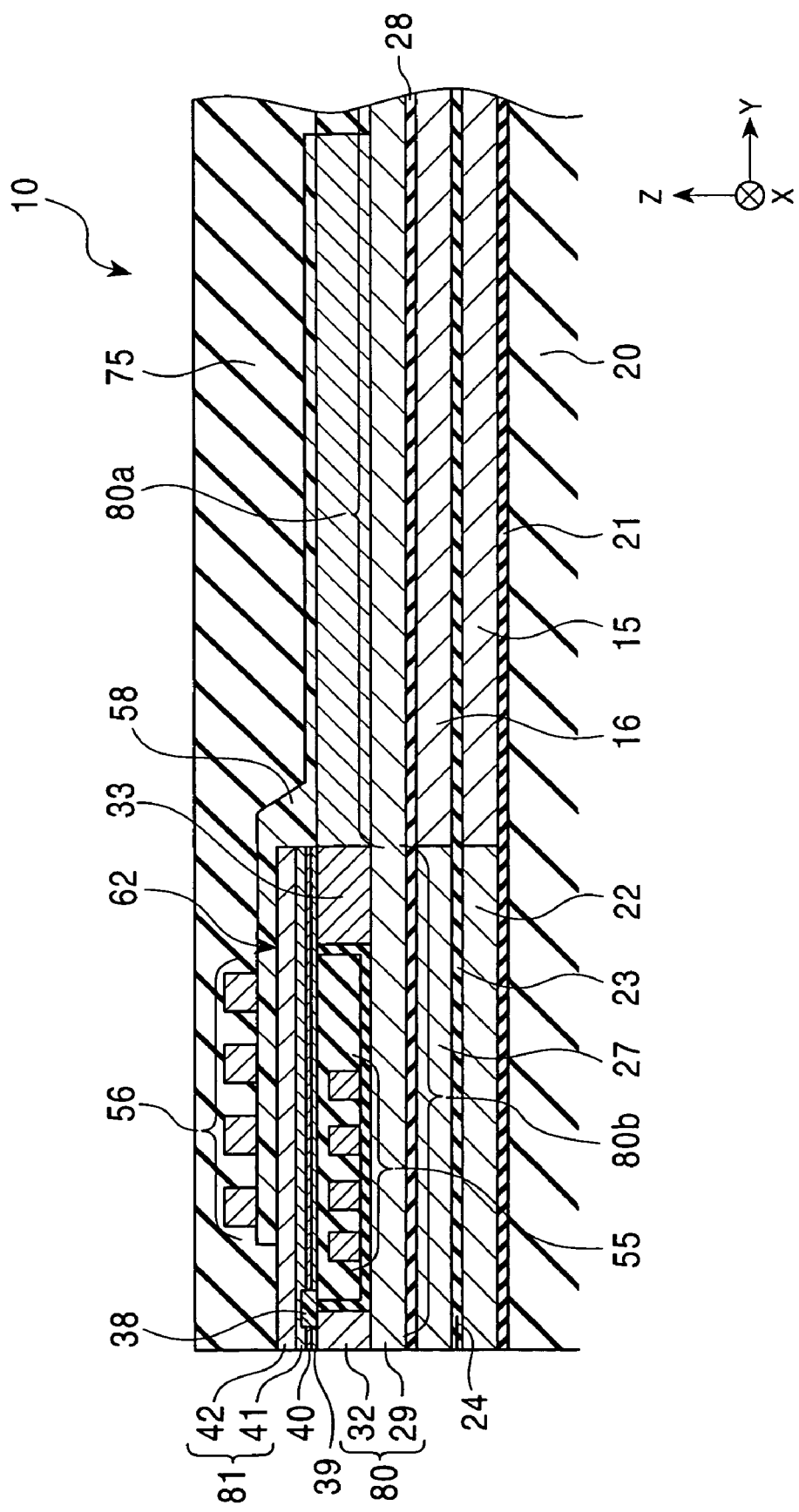

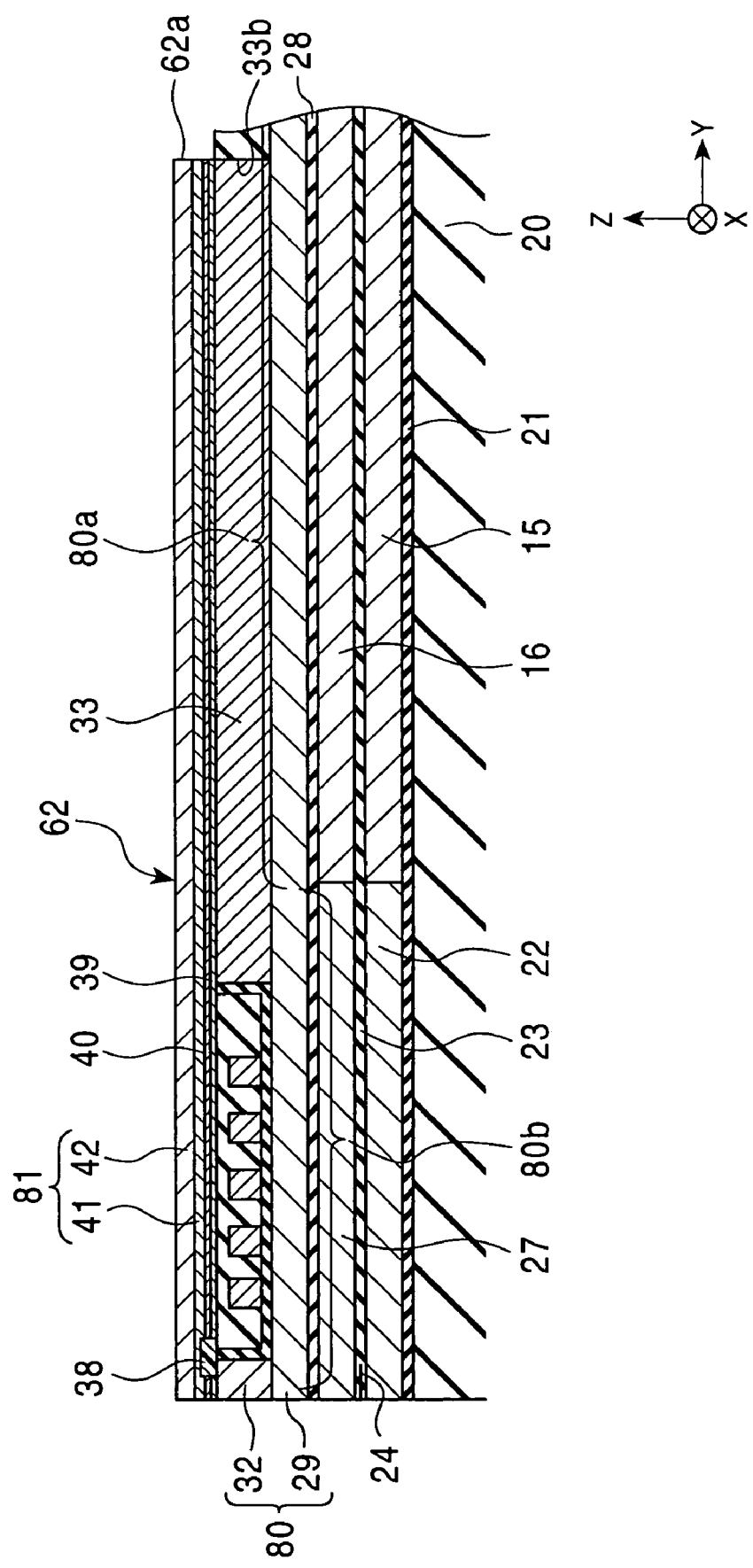

THIN-FILM MAGNETIC HEAD INCLUDING A TOROIDAL COIL LAYER AND CONNECTING LAYER FORMED BETWEEN A FIRST AND SECOND MAGNETIC CORES DISPOSED AT A BACK SIDE OF THE TOROIDAL COIL LAYER

This application claims the benefit of priority to Japanese Patent Application No. 2003-158764, herein incorporated by reference.

BACKGROUND OF THE INVENTION

1. Field of the Invention

The present invention relates to a thin-film magnetic head including a toroidal coil layer, for example, used for a floating-type thin-film magnetic head unit. More particularly, the invention relates to a thin-film magnetic head including a toroidal coil layer in which the heat capacity is increased in a region extending in the height direction at the back of the toroidal coil layer and in which excellent heat dissipation ability is exhibited.

2. Description of the Related Art

Recently, thin-film magnetic write heads (inductive heads) provided with core layers and coil layers have been miniaturized as recording densities have been increased. Consequently, coil layers must be formed by winding in very small spaces.

Instead of thin-film magnetic heads having a spiral coil structure which uses a space between a lower core layer and an upper core layer and in which a coil layer is spirally wound around a connecting section which connects the lower core layer and the upper core layer to each other, thin-film magnetic heads having a toroidal coil structure in which a coil layer is toroidally wound around a core layer are thought to become mainstream inductive heads.

In the miniaturized inductive heads using such a toroidal coil layer, the following problem has particularly become obvious. That is, in the inductive head with the toroidal structure, since the coil layer is integrated in the front region in the height direction, Joule heat generated by a recording current flowing through the coil layer and heat due to an eddy current generated in the core are not easily dissipated efficiently from the inductive head. As a result, the temperature inside the inductive head is remarkably increased.

If the temperature inside the inductive head is increased, a so-called "pole tip protrusion (PTP)" phenomenon occurs, i.e., due to the difference in the coefficient of thermal expansion between the coil layer or the core layer composed of metallic materials and the insulating material surrounding them, the inductive head section is likely to protrude from the surface facing a recording medium compared to the other section.

In particular, in the thin-film magnetic head in which a high recording density is enabled, because of the high frequency of the recording current applied to the toroidal coil, the temperature inside the inductive head is rapidly increased, and protrusion from the surface facing the recording medium increases. If the inductive head protrudes from the surface facing the recording medium, the inductive head is more likely to collide with the recording medium, thereby damaging the recording medium or being damaged by the recording medium.

Thin-film magnetic heads in which heat generated in the inductive heads can be dissipated and the PTP phenomenon can be inhibited are disclosed, for example, in Japanese Unexamined Patent Application Publication No. 2001-093113 (Patent Document 1), Japanese Unexamined Patent Application Publication No. 2001-126216 (Patent Document 2), and Japanese Unexamined Patent Application Publication No. 7-282419 (Patent Document 3).

The thin-film magnetic head according to Patent Document 1 has the toroidal structure as that described above. In this thin-film magnetic head, a lower core layer extends in the height direction at the back of a back gap layer disposed on the lower core layer. The lower core layer in the region at the back of the back gap layer is thought to function as a heat-dissipating member for dissipating heat generated in the coil layer and the core layer.

However, in the thin-film magnetic head according to Patent Document 1, the back gap layer has a small length in the height direction and has a small volume. Generally, in the inductive head, aside from heat generated in the coil layer and the core layer, heat is also generated from the back gap layer due to an eddy current occurring in the back gap layer. In the thin-film magnetic head according to Patent Document 1, since the volume of the back gap layer is small, the heat capacity of the back gap layer is small, and the heat dissipation effect is small. An insulating layer is disposed above the lower core layer at the back of the back gap layer, and thereby the ability to effectively dissipate heat transmitted to the back region of the lower core layer is small.

In the thin-film magnetic head according to Patent Document 2, as shown in FIG. 8, etc., of Patent Document 2, a back gap layer extends in the height direction. The back gap layer is thought to function as a heat-dissipating member for dissipating heat generated in the coil layer and the core layer.

However, since the thin-film magnetic head according to Patent Document 2 has a spiral coil structure in which the coil layer is spirally wound around the back gap layer, the coil layer is also disposed at the back of the back gap layer and at the sides of the back gap layer. Therefore, there are limitations in forming the back gap layer with a large area extending longitudinally in the height direction or extending laterally in the track width direction, and thereby there are limitations in allowing the back gap layer to effectively function as the heat-dissipating member.

In the thin-film magnetic head according to Patent Document 3, a connecting section disposed at the back of an upper core layer and a lower core layer for connecting both core layers is thought to function as a heat-dissipating member for dissipating heat generated in the coil layer and the core layers.

However, since the thin-film magnetic head according to Patent Document 3 also has the spiral coil structure as in the thin-film magnetic head according to Patent Document 2, the coil layer is spirally wound around the connecting section.

Therefore, there are also limitations in forming the connecting section with a large area, and thereby there are limitations in allowing the connecting section to effectively function as the heat-dissipating member. In the thin-film magnetic head according to Patent Document 3, first of all, since the connecting section is composed of the upper core layer and the lower core layer, an increase in the size of the connecting section itself is limited, and thereby there are limitations in allowing the connecting section to function as the heat-dissipating member.

SUMMARY OF THE INVENTION

It is an object of the present invention to provide a thin-film magnetic head including a toroidal coil layer in which the heat capacity is increased in a region extending in the height direction at the back of the toroidal coil layer and in which excellent heat dissipation ability is exhibited.

In a first aspect of the present invention, a thin-film magnetic head includes a first magnetic core extending in the height direction from a surface facing a recording medium; a second magnetic core disposed above the first magnetic core, the second magnetic core facing the first magnetic core with a gap layer therebetween at the surface facing the recording medium, the second magnetic core being connected to the first magnetic core with a connecting layer at the back side in the height direction; a toroidal coil layer including a plurality of first coil strips provided in a space surrounded by the first magnetic core and the second magnetic core and a plurality of second coil strips provided above the second magnetic core, the plurality of first coil strips and the plurality of second coil strips being electrically connected to each other and being wound around the second magnetic core; a read head section including a shielding layer and a magnetoresistive element; and a metal layer extending at the back of the shielding layer in the height direction, wherein the connecting layer extends in the height direction so as to face the metal layer in the thickness direction.

In the thin-film magnetic head of the present invention, the metal layer extends at the back of the shielding layer constituting the read head section. The connecting layer extends in the height direction so as to face the metal layer in the thickness direction. Consequently, in the thin-film magnetic head of the present invention, the length of the connecting layer in the height direction can be increased compared with the conventional thin-film magnetic head. Thereby, the volume of the connecting layer can be increased so that the heat capacity can be increased, and the connecting layer is allowed to effectively function as a heat-dissipating member. As a result, heat due to an eddy current generated in the connecting layer can be efficiently dissipated from the connecting layer. Since the connecting layer extends in the height direction so as to face the metal layer in the thickness direction, the metal layer extending at the back of the shielding layer in the height direction, in particular, it is possible to transmit heat generated in the vicinity of the surface facing the recording medium, which affects PTP, by the connecting layer to the back region in the height direction apart from the surface facing the recording medium, and moreover, it is possible to dissipate heat through the connecting layer having large heat dissipation ability. Consequently, it is possible to prevent PTP from being caused by heat generated in the vicinity of the surface facing the recording medium.

In the thin-film magnetic head of the present invention, since the size of the connecting layer can be increased compared with the conventional thin-film magnetic head having the toroidal coil structure, it is also possible to decrease magnetic resistance.

Preferably, the length of the connecting layer is larger than the length of the toroidal coil layer.

In such a structure, the heat capacity of the connecting layer can be increased.

Preferably, the first magnetic core includes a back region which extends in the height direction so as to face the metal layer in the thickness direction, and the connecting layer is disposed on the back region.

In such a structure, heat due to an eddy current generated in the second magnetic core and Joule heat generated in the toroidal coil layer are transmitted to the second magnetic core. Heat transmitted to the second magnetic core and heat due to an eddy current generated in the second magnetic layer are transmitted to the back region of the first magnetic core and dissipated to the outside of the magnetic head through the connecting layer disposed above the back region. In particular, heat generated in the vicinity of the surface facing the recording medium, which affects PTP, can be transmitted to the back region apart from the surface facing the recording medium, and moreover, the heat can be dissipated through the connecting layer having large heat dissipation ability. Consequently, it is possible to prevent PTP from being caused by heat generated in the vicinity of the surface facing the recording medium.

In the thin-film magnetic head described above, preferably, the shielding layer includes an upper shielding layer disposed on the magnetoresistive element, the metal layer is disposed at the back in the height direction of the upper shielding layer, and the back region of the first magnetic core is in contact with the metal layer.

The second magnetic core may include a back region which extends in the height direction so as to face the back region of the first magnetic core in the thickness direction.

In such a structure, heat generated in the second magnetic core can be transmitted to the connecting layer which faces the back region in the thickness direction, and thereby heat generated in the second magnetic core can be easily dissipated, resulting in a further improvement in the heat dissipation ability in the entire thin-film magnetic head.

The back region of the first magnetic core, the connecting layer, and the back region of the second magnetic core may be disposed in that order on the metal layer.

In such a structure, both heat generated in the first magnetic core and heat generated in the second magnetic core can be efficiently dissipated through the connecting layer.

In a second aspect of the present invention, a thin-film magnetic head includes a first magnetic core extending in the height direction from a surface facing a recording medium; a second magnetic core disposed above the first magnetic core, the second magnetic core facing the first magnetic core with a gap layer therebetween at the surface facing the recording medium, the second magnetic core being connected to the first magnetic core with a connecting layer at the back side in the height direction; and a toroidal coil layer including a plurality of first coil strips provided in a space surrounded by the first magnetic core and the second magnetic core and a plurality of second coil strips provided above the second magnetic core, the plurality of first coil strips and the plurality of second coil strips being electrically connected to each other and being wound around the second magnetic core, wherein the width in the track width direction of the connecting layer is larger than the width in the track width direction of the toroidal coil layer.

In the thin-film magnetic head of the present invention described above, the width in the track width direction of the connecting layer is larger than the width in the track width direction of the toroidal coil layer. Since the width in the track width direction of the connecting layer can be increased compared with the conventional thin-film magnetic head, the volume of the connecting layer can be increased so that the heat capacity can be increased. Thereby, the connecting layer is allowed to effectively function as a heat-dissipating member. As a result, heat due to an eddy current generated in the connecting layer can be efficiently dissipated from the connecting layer.

Heat due to an eddy current generated in the second magnetic core and Joule heat generated in the toroidal coil layer are transmitted to the second magnetic core. Heat transmitted to the second magnetic core and heat due to an eddy current generated in the second magnetic layer are transmitted through the connecting layer disposed under the second magnetic core and dissipated to the outside of the magnetic head. In particular, heat generated in the vicinity of the surface facing the recording medium, which affects PTP, can be transmitted to the connecting layer apart from the surface facing the recording medium, and moreover, the heat can be dissipated through the connecting layer having large heat dissipation ability. Consequently, it is possible to prevent PTP from being caused by heat generated in the vicinity of the surface facing the recording medium.

In the thin-film magnetic head of the present invention, since the size of the connecting layer can be increased compared with the conventional thin-film magnetic head having the toroidal coil structure, it is also possible to decrease magnetic resistance.

In the thin-film magnetic head according to the first or second aspect of the present invention, the first magnetic core may include a lower core layer extending from the surface facing the magnetic medium in the height direction and an elevation layer extending from the surface facing the magnetic medium in the height direction with a predetermined length, the second magnetic core being disposed on the elevation layer with the gap layer therebetween. The second magnetic core may include at least an upper pole layer and an upper core layer disposed thereon.

BRIEF DESCRIPTION OF THE DRAWINGS

FIG. 17 is a longitudinal sectional view showing a step subsequent to the step shown in FIG. 16; and FIG. 18 is a longitudinal sectional view showing a step in a method for fabricating the thin-film magnetic head shown in FIGS. 4 and 5.

DESCRIPTION OF THE PREFERRED EMBODIMENTS

Figure 1:
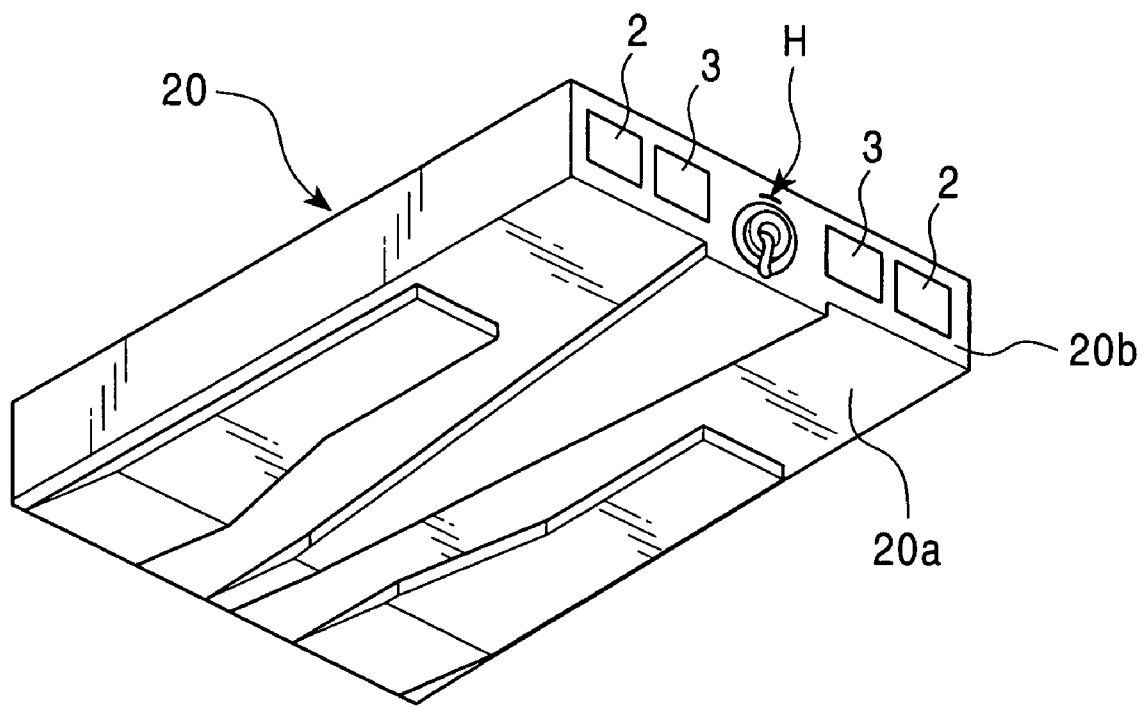
FIG. 1 is a perspective view showing a slider provided with a thin-film magnetic head of the present invention.
Figure 2:
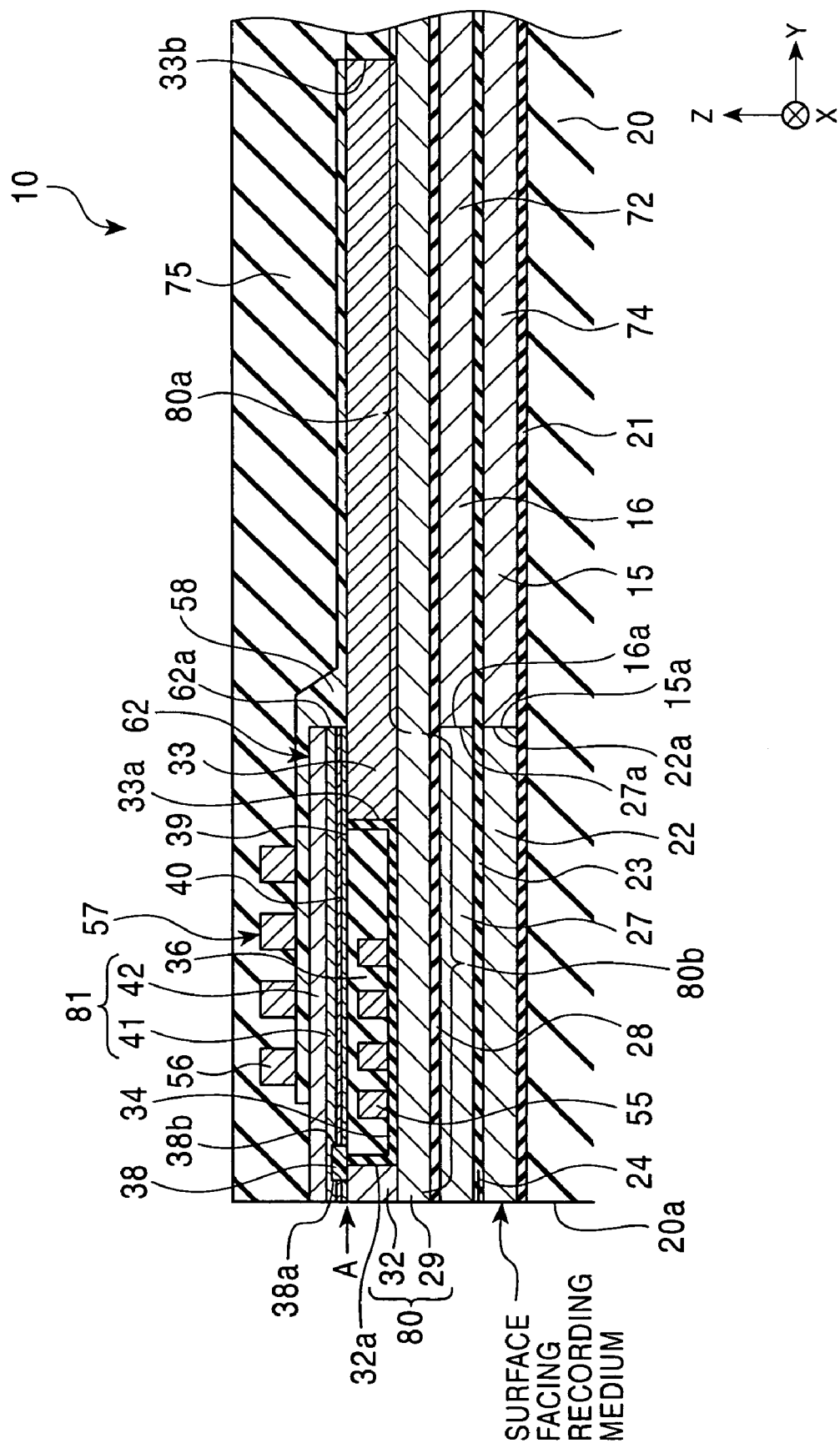
FIG. 2 is a longitudinal sectional view showing a structure of a thin-film magnetic head according to an embodiment of the present invention.
Figure 3:
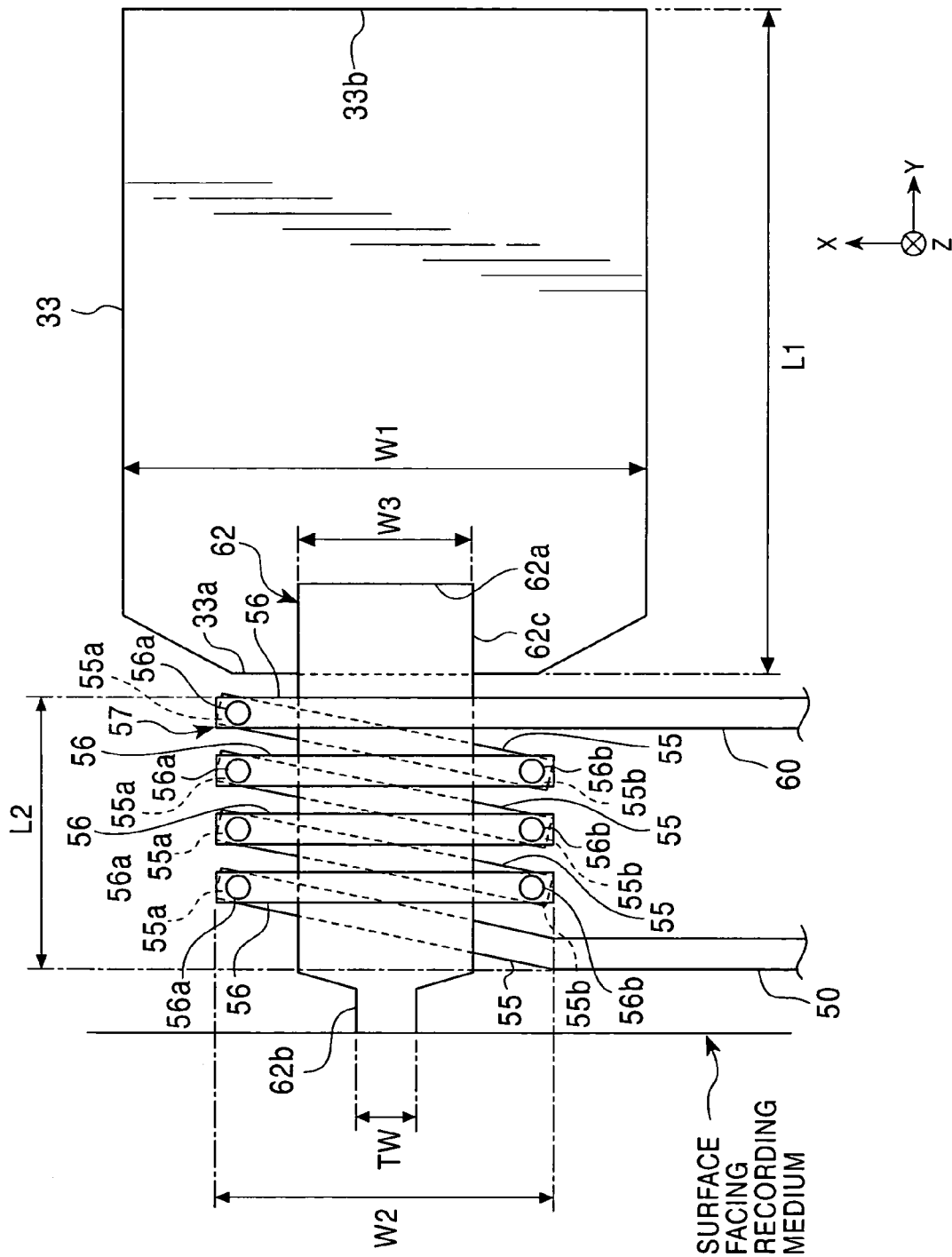
FIG. 3 is a partial plan view of the thin-film magnetic head shown in FIG. 2.

FIG. 1 is a perspective view showing a slider provided with a thin-film magnetic head of the present invention. FIG. 2 is a longitudinal sectional view showing a structure of a thin-film magnetic head according to an embodiment of the present invention, and FIG. 3 is a partial plan view of the thin-film magnetic head shown in FIG. 2.

Hereinafter, the X direction in the drawing will be referred to as the track width direction, and the Y direction in the drawing will be referred to as the height direction. The Z direction in the drawing corresponds to the traveling direction of a recording medium (magnetic disk). The front end face (leftmost surface in FIG. 2) of the thin-film magnetic head will be referred to as the "surface facing a recording medium". In each layer, the "front end face (front end)" corresponds to the left surface in FIG. 2, and the "back end face (back end)" corresponds to the right surface in FIG. 2.

A thin-film magnetic head 10 shown in FIG. 2 is a combined thin-magnetic head including a write head (inductive head) section and a read head (MR head) section. The thin-film magnetic head 10 may include a write head section only.

Referring to FIG. 1, reference numeral 20 represents a slider composed of alumina-titanium carbide ($Al_2O_3$—TiC) or the like, and a surface 20a faces a recording medium. A thin-film magnetic head H and terminals 2 and 3 are disposed on a trailing end 20b of the slider 20. A toroidal coil layer 57 constituting the thin-film magnetic head 10 (H) is connected to the terminals 2 with lead layers. When a magnetoresistive element of a MR head section is provided, a sensing current is applied to the terminals 3 and a magnetic read signal is obtained from the terminals 3.

As shown in FIG. 2, an $Al_2O_3$ layer 21 is disposed on the slider 20. A lower shielding layer 22 composed of a NiFe-based alloy, sendust, or the like is disposed on the $Al_2O_3$ layer 21.

As shown in FIG. 2, a first metal layer 15 is disposed on the $Al_2O_3$ layer so as to extend from a back end 22a of the lower shielding layer 22 in the height direction.

The first metal layer 15 is disposed at the back in the height direction of the toroidal coil layer 57 which will be described in detail below.

The first metal layer 15 may be composed of a magnetic material as in the case of the lower shielding layer 22 or may be composed of a nonmagnetic conductive material. Since the first metal layer 15 functions as a heat-dissipating layer for transmitting heat to the slider 20, the first metal layer 15 is preferably composed of a nonmagnetic conductive material having a good thermal conductivity.

Each of the lower shielding layer 22 and the first metal layer 15 is formed by plating.

As shown in FIG. 2, the back end 22a of the lower shielding layer 22 and a front end 15a of the first metal layer 15 are in contact with each other and combined together. The upper surface of the lower shielding layer 22 and the upper surface of the first metal layer 15 are substantially flush with each other and form a substantially planar surface. However, an embedded layer composed of $Al_2O_3$ or the like may be disposed between the back end 22a of the lower shielding layer 22 and the front end 15a of the first metal layer 15. In such a case, the upper surface of the lower shielding layer 22, the upper surface of the first metal layer 15, and the upper surface of the embedded layer are substantially flush with each other and form a substantially planar surface.

Instead of disposing the first metal layer 15 on the $Al_2O_3$ layer, the lower shielding layer 22 may be disposed so as to extend to the position at which the first metal layer 15 is disposed.

A gap layer 23 including a lower gap layer and an upper gap layer composed of $Al_2O_3$ or the like extends over the lower shielding layer 22 and the first metal layer 15.

A magnetoresistive element 24, such as a spin-valve thin-film element, e.g., a GMR element, is disposed in the gap layer 23, and the front face of the magnetoresistive element 24 is exposed at the surface facing the recording medium.

An upper shielding layer 27 composed of a NiFe-based alloy or the like is disposed on the gap layer 23.

As shown in FIG. 2, a second metal layer 16 is disposed on the gap layer 23 so as to extend from a back end 27a of the upper shielding layer 27 in the height direction.

The second metal layer 16 is disposed at the back in the height direction of the toroidal coil layer 57.

The second metal layer 16 may be composed of a magnetic material as in the case of the upper shielding layer 27 or may be composed of a nonmagnetic conductive material. Since the second metal layer 16 functions as a heat-dissipating layer for transmitting heat to the slider 20, the second metal layer 16 is preferably composed of a nonmagnetic conductive material having a good thermal conductivity.

Each of the upper shielding layer 27 and the second metal layer 16 is formed by plating.

As shown in FIG. 2, the back end 27a of the upper shielding layer 27 and a front end 16a of the second metal layer are in contact with each other and combined together. The upper surface of the upper shielding layer 27 and the upper surface of the second metal layer 16 are substantially flush with each other and form a substantially planar surface. However, an embedded layer composed of $Al_2O_3$ or the like may be disposed between the back end 27a of the upper shielding layer 27 and the front end 16a of the second metal layer 16. In such a case, the upper surface of the upper shielding layer 27, the upper surface of the second metal layer 16, and the upper surface of the embedded layer are substantially flush with each other and form a substantially planar surface.

The back surface 22a of the lower shielding layer 22 and the back surface 27a of the upper shielding layer 27 are at substantially the same distance from the surface facing the recording medium. The front surface 15a of the first metal layer 15 and the front surface 16a of the second metal layer 16 are at substantially the same distance from the surface facing the recording medium.

A region from the lower shielding layer 22 to the upper shielding layer 27 is referred to as a read head (MR head).

As shown in FIG. 2, a separation layer 28 composed of $Al_2O_3$ or the like is disposed on the upper shielding layer 27 and the second metal layer 16. Additionally, the upper shielding layer 27 and the separation layer 28 may be omitted and a lower core layer 29 may be disposed on the gap layer 23. In such a case, the lower core layer 29 also acts as an upper shielding layer.

Referring to FIG. 2, the lower core layer 29 which constitutes a first magnetic core 80 is disposed on the separation layer 28. The lower core layer 29 is composed of a magnetic material, such as a NiFe-based alloy. The lower core layer 29 extends from the surface facing the recording medium in the height direction (in the Y direction).

An elevation layer 32 is disposed on the lower core layer 29 so as to extend from the surface facing the recording medium at a predetermined length.

The elevation layer 32 and a back gap layer 33 are magnetically coupled to the lower core layer 29, and the lower core layer 29 and the elevation layer 32 constitute the first magnetic core 80.

The back gap layer 33 is disposed at a predetermined distance in the height direction (in the Y direction) from a back end 32a of the elevation layer 32, the back gap layer 33 functioning as a connecting layer for connecting the lower core layer 29 which constitutes the first magnetic core 80 with a second magnetic core 81 which will be described below.

Each of the elevation layer 32 and the back gap layer 33 is composed of a magnetic material which may be the same as or different from that for the lower core layer 29. Each of the elevation layer 32 and the back gap layer 33 may be single-layered or multi-layered.

As shown in FIG. 2, a coil-insulating underlayer 34 is disposed on the lower core layer 29 between the elevation layer 32 and the back gap layer 33, and a plurality of first coil strips 55 composed of a conductive material are disposed on the coil-insulating underlayer 34.

The first coil strips 55 are, for example, composed of at least one metal selected from the group consisting of Au, Ag, Pt, Cu, Cr, Al, Ti, NiP, Mo, Pd, Rh, and Ni. The first coil strips 55 may have a multi-layered structure including layers composed of these metals.

The first coil strips 55 are embedded in a coil-insulating layer 36 composed of an inorganic insulating material, such as $Al_2O_3$. As shown in FIG. 2, the upper surface of the elevation layer 32, the upper surface of the coil-insulating layer 36, and the upper surface of the back gap layer 33 form a continuous planar surface along the datum plane A shown in FIG. 2.

A Gd-defining layer 38 is disposed on the elevation layer 32 and the coil-insulating layer 36, the Gd-defining layer 38 extending from a position at a predetermined distance from the surface facing the recording medium in the height direction (in the Y direction) as shown in FIG. 2.

A lower pole layer 39 and a gap layer 40 are disposed in that order on the elevation layer 32 so as to extend from the surface facing the recording medium to a front end 38a of the Gd-defining layer 38, on the coil-insulating layer 36 so as to extend from a back end 38b of the Gd-defining layer 38 in the height direction, and on the back gap layer 33. Each of the lower pole layer 39 and the gap layer 40 is formed by plating. The length in the height direction of the gap layer 40 is defined by the Gd-defining layer 38.

As shown in FIG. 2, an upper pole layer 41 is formed by plating on the gap layer 40 and the Gd-defining layer 38. An upper core layer 42 is further formed by plating on the upper pole layer 41.

The upper pole layer 41 and the upper core layer 42 constitute the second magnetic core 81.

In the embodiment shown in FIG. 2, at the height side of the Gd-defining layer 38, the lower pole layer 39 and the gap layer 40 are disposed between the second magnetic core 81 and the back gap layer 33. Consequently, the first magnetic core 80 and the second magnetic core 81 are connected to each other via the lower pole layer 39 and the back gap layer 33 which functions as the connecting layer. However, at the height side of the Gd-defining layer 38, the lower pole layer 39 and the gap layer 40 may be omitted, and in such a case, the first magnetic core 80 and the second magnetic core 81 are connected to each other only via the back gap layer 33.

In this embodiment, the lower pole layer 39, the gap layer 40, and the second magnetic core (the upper pole layer 41 and the upper core layer 42) constitute a magnetic pole layer 62.

The lower pole layer 39 may be omitted at the opposite side to the height side of the Gd-defining layer 38. If the lower pole layer 39 is provided, it becomes possible to narrow the gap.

The magnetic pole layer 62, for example, has a shape shown in FIG. 3 when viewed from directly above. A front region 62b of the magnetic pole layer 62 on the side of the surface facing the recording medium has a narrow width in the track width direction (In the X direction), and the width in the track width direction of the front region 62b at the surface facing the recording medium corresponds to a track width Tw. The track width Tw is, for example, 0.7 μm or less, and preferably 0.5 μm or less. In a back region 62c of the magnetic pole layer 62, the width in the track width direction increases from the end of the front region 62b in the height direction (in the Y direction), and the area of the back region 62c is sufficiently larger than the area of the front region 62b.

As shown in FIG. 2, an insulating layer 58 composed of a resist or the like is disposed on the upper core layer 42. The insulating layer 58 is preferably composed of an organic insulating material.

A plurality of second coil strips 56 composed of a conductive material are disposed on the insulating layer 58.

The second coil strips 56 are, for example, composed of at least one metal selected from the group consisting of Au, Ag, Pt, Cu, Cr, Al, Ti, NiP, Mo, Pd, Rh, and Ni. The second coil strips 56 may have a multi-layered structure including layers composed of these metals.

The first coil strips 55 and the second coil strips 56 are electrically connected to each other at the respective ends in the track width direction. Thereby, the toroidal coil layer 57 is formed in which the first coil strips 55 and the second coil strips 56 are wound around the magnetic pole layer 62.

A protective layer 75 composed of an insulating material, such as $Al_2O_3$ or AlSiO, is disposed on the toroidal coil layer 57.

FIG. 3 is a partial plan view of the thin-film magnetic head 10 shown in FIG. 2. FIG. 3 shows only the magnetic pole layer 62, the first coil strips 55, the second coil strips 56, the back gap layer 33, and lead layers 50 and 60.

As shown in FIG. 3, each second coil strip 56 has joints 56a and 56b on both ends in the track width direction (in the X direction), and each first coil strip 55 has joints 55a and 55b on both ends in the track width direction. The joint 55a of each first coil strip 55 is electrically connected to the joint 56a of the second coil strip 56 at its corresponding position in the thickness direction (in the Z direction) directly or via a separate connecting layer (not shown in the drawing). The joint 55b of each first coil strip 55 is electrically connected to the joint 56b of the second coil strip 56 one row ahead (at the surface facing the recording medium side) directly or via a separate connecting layer (not shown in the drawing). By connecting the first coil strips 55 and the second coil strips 56 in zigzags as described above, the toroidal coil layer 57 which is wound around the magnetic pole layer 62 is obtained.

The lead layer 60 is integrally formed with the backmost second coil strip 56 and led out of the toroidal coil layer 57 toward the surface facing the recording medium. An end (not shown in the drawing) of the lead layer 60 is connected to one of the terminals 2. The lead layer 50 is integrally formed with the front first coil strip 55, and an end (not shown in the drawing) of the lead layer 50 is connected to the other terminal 2. Each of the lead layers 50 and 60 may be formed separately from the first coil strip 55 or the second coil strip 56.

The characteristics of the thin-film magnetic head 10 shown in FIGS. 2 and 3 will be described below.

As shown in FIG. 2, the first magnetic core 80 includes a back region 80a of the lower core layer 29 which faces the second metal layer 16 in the thickness direction and a front region 80b disposed in front of the back region 80a on the surface facing recording medium side.

The back gap layer 33 is disposed on the lower core layer 29. A front end 33a of the back gap layer 33 is located on the front region 80b of the first magnetic core 80, while a back end 33b of the back gap layer 33 is located on the back region 80a of the first magnetic core 80.

As shown in FIG. 3, the width W1 of the back gap layer 33 is larger than the width W2 of the toroidal coil layer 57. However, the width W1 may be the same as the width W2. In this specification, the width W1 of the back gap layer 33 is defined as the maximum width in the track width direction (in the X direction) of the back gap layer 33, and the width W2 of the toroidal coil layer 57 is defined as the maximum width in the track width direction of the toroidal coil layer 57.

As shown in FIG. 3, the length L1 of the back gap layer 33 is preferably larger than the length L2 of the toroidal coil layer 57. In this specification, the length L1 of the back gap layer 33 is defined as the maximum length in the height direction from the front end 33a to the back end 33b of the back gap layer 33. The length L2 of the toroidal coil layer 57 is defined as the maximum length in the height direction from the first coil strip 55 located at the surface facing the recording medium side to the second coil strip 56 which is remotest from the surface facing the recording medium.

As shown in FIGS. 2 and 3, a back end 62a of the magnetic pole layer 62 and the front end 16a of the second metal layer 16 are at substantially the same distance from the surface facing the recording medium. The back end 62a of the magnetic pole layer 62 is closer to the surface facing the recording medium than the back end 33b of the back gap layer 33. The width W3 of the magnetic pole layer 62 is smaller than the width W1 of the back gap layer 33. In this specification, the width W3 of the magnetic pole layer 62 is defined as the maximum width in the track width direction of the magnetic pole layer 62.

In the thin-film magnetic head 10, the first magnetic core 80 includes the back region 80a which extends so as to face the second metal layer 16 in the thickness direction. The back gap layer 33 also extends so as to face the back region 80a of the first magnetic core 80 in the thickness direction.

The width W1 of the back gap layer 33 is larger than the width W2 of the toroidal coil layer 57.

Consequently, in the thin-film magnetic head 10, it is possible to increase the heat capacity by increasing the volume of the back gap layer 33 compared with the conventional thin-film magnetic head. The back gap layer 33 is allowed to effectively function as a heat-dissipating member. As a result, heat due to an eddy current generated in the back gap layer 33 can be efficiently dissipated from the back gap layer 33 through the protective layer 75 or from the back gap layer 33 through the lower core layer 29, the second metal layer 16, and the first metal layer 15 to the outside of the thin-film magnetic head 10.

In particular, since the back gap layer 33 is disposed so as to face the first metal layer 15 and the second metal layer 16 which are disposed at the back in the height direction of the lower shielding layer 22 and the upper shielding layer 27 and since the back gap layer 33 is also disposed at the back in the height direction of the toroidal coil layer 57, it is possible to transmit heat generated in the vicinity of the surface facing the recording medium, which affects PTP, by the back gap layer 33 to the back region apart from the surface facing the recording medium. Moreover, since heat can be dissipated through the back gap layer 33 having large heat dissipation ability, it is possible to prevent PTP from being caused by heat generated in the vicinity of the recording medium.

Heat due to an eddy current generated in the magnetic layer 62 and Joule heat generated in the toroidal coil layer 57 are transmitted to the lower core layer 29. Heat transmitted to the lower core layer 29 and heat due to an eddy current generated in the lower core layer 29 can be transmitted to the back region 80a and dissipated to the outside of the thin-film magnetic head 10 through the back gap layer 33 disposed on the back region 80a or through the second metal layer 16 and the first metal layer 15. In particular, heat generated in the vicinity of the surface facing the recording medium, which affects PTP, can be transmitted to the back region 80a apart from the surface facing the recording medium, and moreover, the heat can be dissipated through the back gap layer 33 having large heat dissipation ability. Consequently, it is possible to prevent PTP from being caused by heat generated in the vicinity of the surface facing the recording medium.

In the thin-film magnetic head 10 of the present invention, since the size of the back gap layer 33 can be increased compared with the conventional thin-film magnetic head having the toroidal structure, it is also possible to decrease magnetic resistance.

Figure 4:
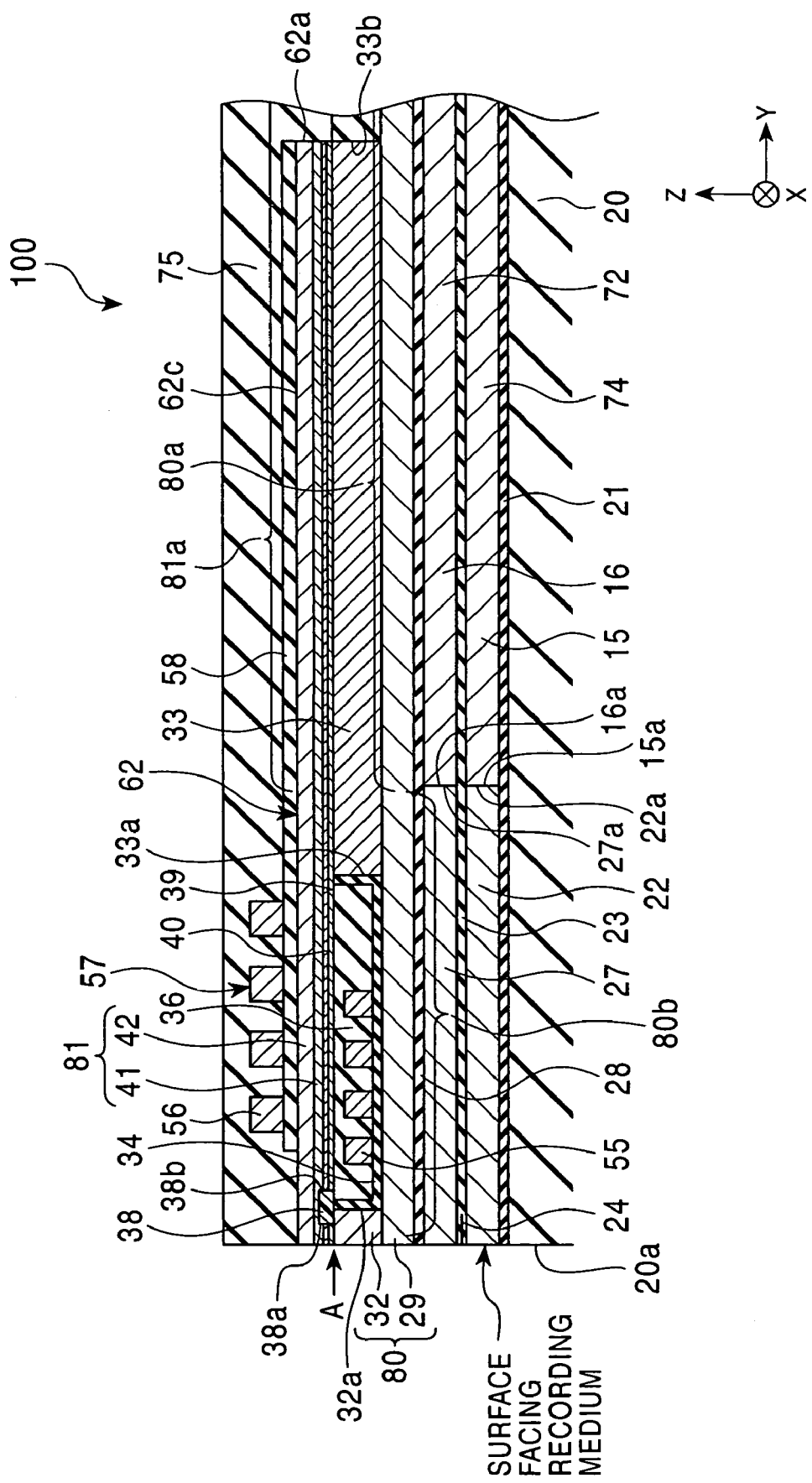
FIG. 4 is a longitudinal sectional view showing a structure of a thin-film magnetic head according to another embodiment of the present invention.
Figure 5:
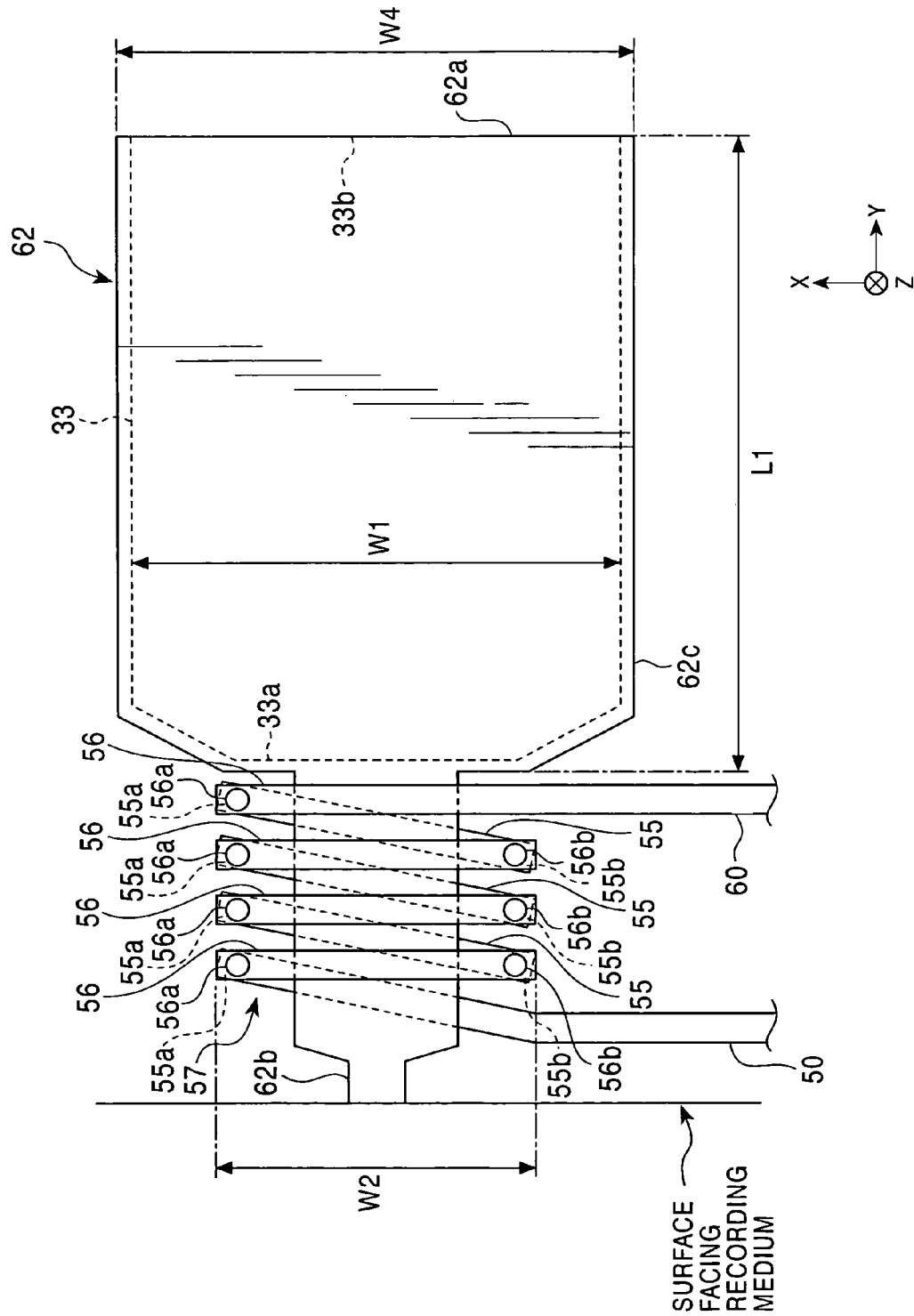
FIG. 5 is a partial plan view of the thin-film magnetic head shown in FIG. 4.

FIG. 4 is a longitudinal sectional view showing a structure of a thin-film magnetic head according to another embodiment of the present invention. FIG. 4 corresponds to FIG. 2. FIG. 5 is a partial plan view of the thin-film magnetic head shown in FIG. 4. FIG. 5 corresponds to FIG. 3.

A thin-film magnetic head 100 shown in FIGS. 4 and 5 has substantially the same structure as that of the thin-film magnetic head 10 shown in FIGS. 2 and 3. In FIGS. 4 and 5, the same elements as those of the thin-film magnetic head 10 shown in FIGS. 2 and 3 are represented by the same reference numerals, and descriptions thereof will be omitted.

The thin-film magnetic head 100 shown in FIGS. 4 and 5 differs from the thin-film magnetic head 10 shown in FIGS. 2 and 3 in that a second magnetic core 81 constituting a magnetic pole layer 62 has a back region 81a which extends so as to face a back region 80a of a first magnetic core 80 in the thickness direction. Furthermore, a lower pole layer 39 and a gap layer 40 are disposed under the back region 81a. The back region 81a and the lower pole layer 39 and the gap layer 40 located under the back region 81a constitute a back region 62c of the magnetic pole layer 62.

In the thin-film magnetic head 100, the upper surface of the back gap layer 33 is covered with the back region 62c of the magnetic pole layer 62. That is, as shown in FIGS. 4 and 5, a back end 62a in the height direction of the magnetic pole layer 62 and a back end 33b of a back gap layer 33 are at substantially the same distance from a surface facing a recording medium. The width W4 of the magnetic pole layer 62 is larger than the width W1 of the back gap layer 33. In this specification, the width W4 of the magnetic pole layer 62 is defined as the maximum width in the track width direction of the magnetic pole layer 62. However, the width W4 of the magnetic pole layer 62 may be set to be the same as the width W1 of the back gap layer 33.

In the thin-film magnetic head 100 shown in FIGS. 4 and 5, the magnetic pole layer 62 is disposed so as to cover the upper surface of the back gap layer 33. Consequently, heat generated in the magnetic pole layer 62 can be transmitted to the back gap layer 33, and thereby heat generated in the magnetic pole layer 62 is easily dissipated, resulting in a further improvement in the heat dissipation ability in the entire thin-film magnetic head 100.

Figure 6:
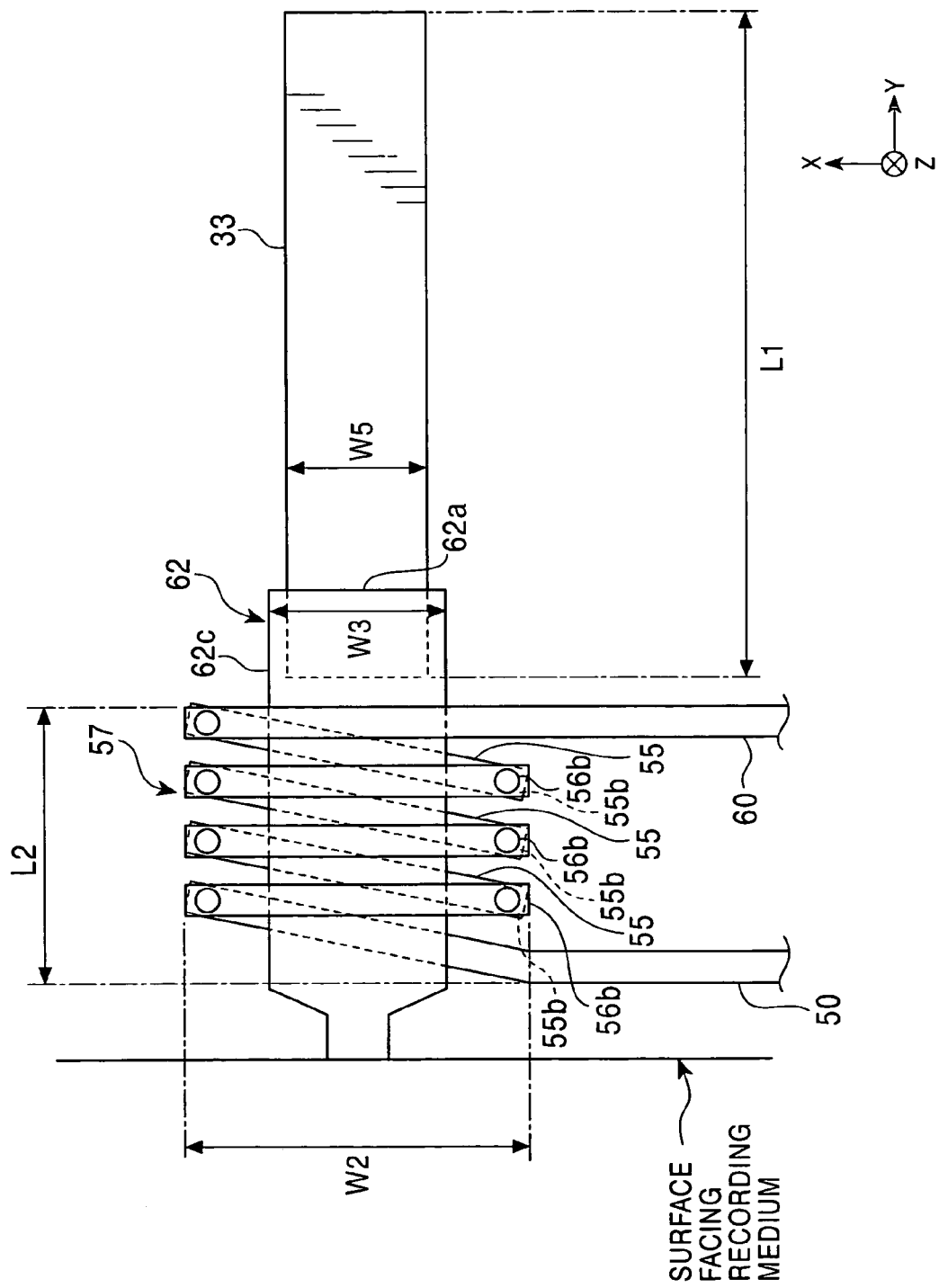
FIG. 6 is a partial plan view of a thin-film magnetic head according to another embodiment of the present invention.
Figure 7:
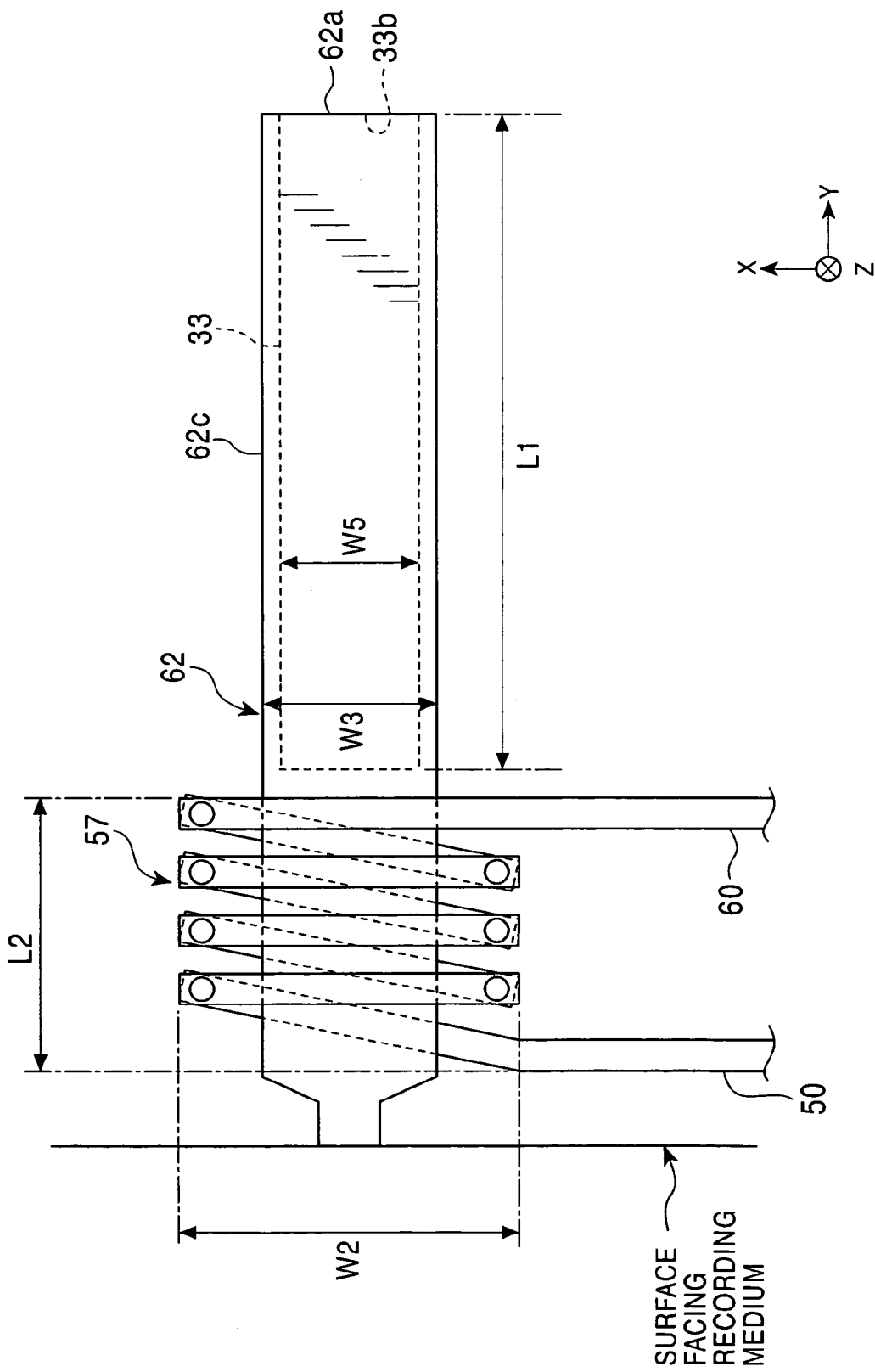
FIG. 7 is a partial plan view of a thin-film magnetic head according to another embodiment of the present invention.

In each of the thin-film magnetic head 10 shown in FIGS. 2 and 3 and the thin-film magnetic head 100 shown in FIGS. 4 and 5, as shown in FIG. 3 or 5, the width W1 of the back gap layer 33 is larger than the width W2 of the toroidal coil layer 57. The present invention is not limited thereto. For example, as shown in FIG. 6 or 7, the maximum width W5 of the back gap layer 33 may be smaller than the width W2 of the toroidal coil layer 57. Even in such a structure, if the back end 33b of the back gap layer 33 is disposed on the back region 80a of the first magnetic core 80, and preferably, if the length L1 of the back gap layer 33 is larger than the length L2 of the toroidal coil layer 57, it is possible to increase the volume of the back gap layer 33 so that the heat capacity can be increased compared with the conventional thin-film magnetic head, and thus the back gap layer 33 is allowed to effectively function as the heat-dissipating member.

In each of the thin-film magnetic head 10 shown in FIGS. 2 and 3 and the thin-film magnetic head 100 shown in FIGS. 4 and 5, as shown in FIG. 3 or 5, the length L1 of the back gap layer 33 is larger than the length L2 of the toroidal coil layer 57. The present invention is not limited thereto. For example, as shown in FIGS. 8 and 9 or FIGS. 10 and 11, the maximum length L3 of the back gap layer 33 may be smaller than the length L2 of the toroidal coil layer 57. Even in such a structure, if the width W1 of the back gap layer 33 is larger than the width W2 of the toroidal coil layer 57, it is possible to increase the volume of the back gap layer 33 so that the heat capacity can be increased, and thus the back gap layer 33 is allowed to effectively function as the heat-dissipating member.

Figure 8:
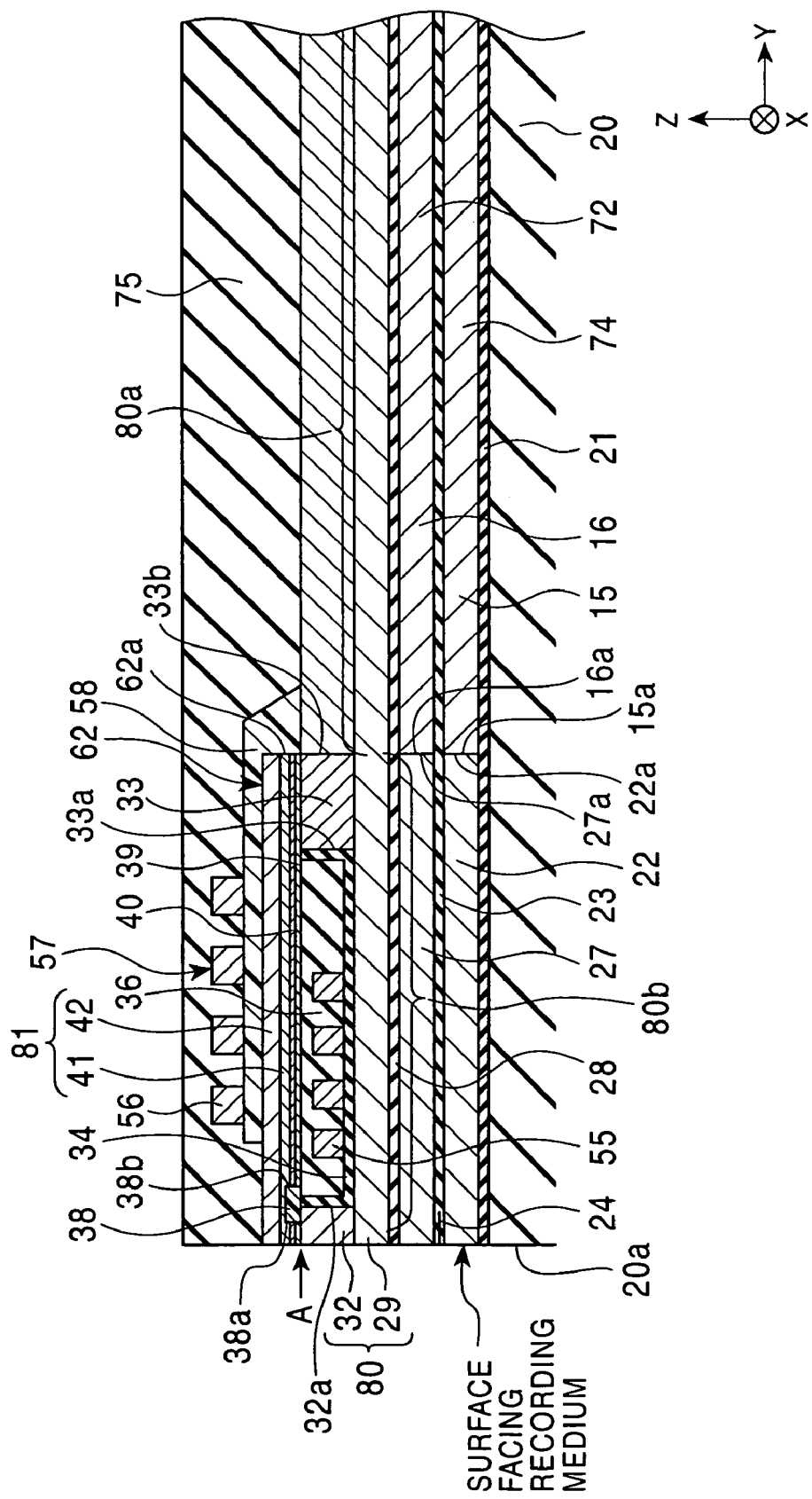
FIG. 8 is a longitudinal sectional view showing a structure of a thin-film magnetic head according to another embodiment of the present invention.
Figure 9:
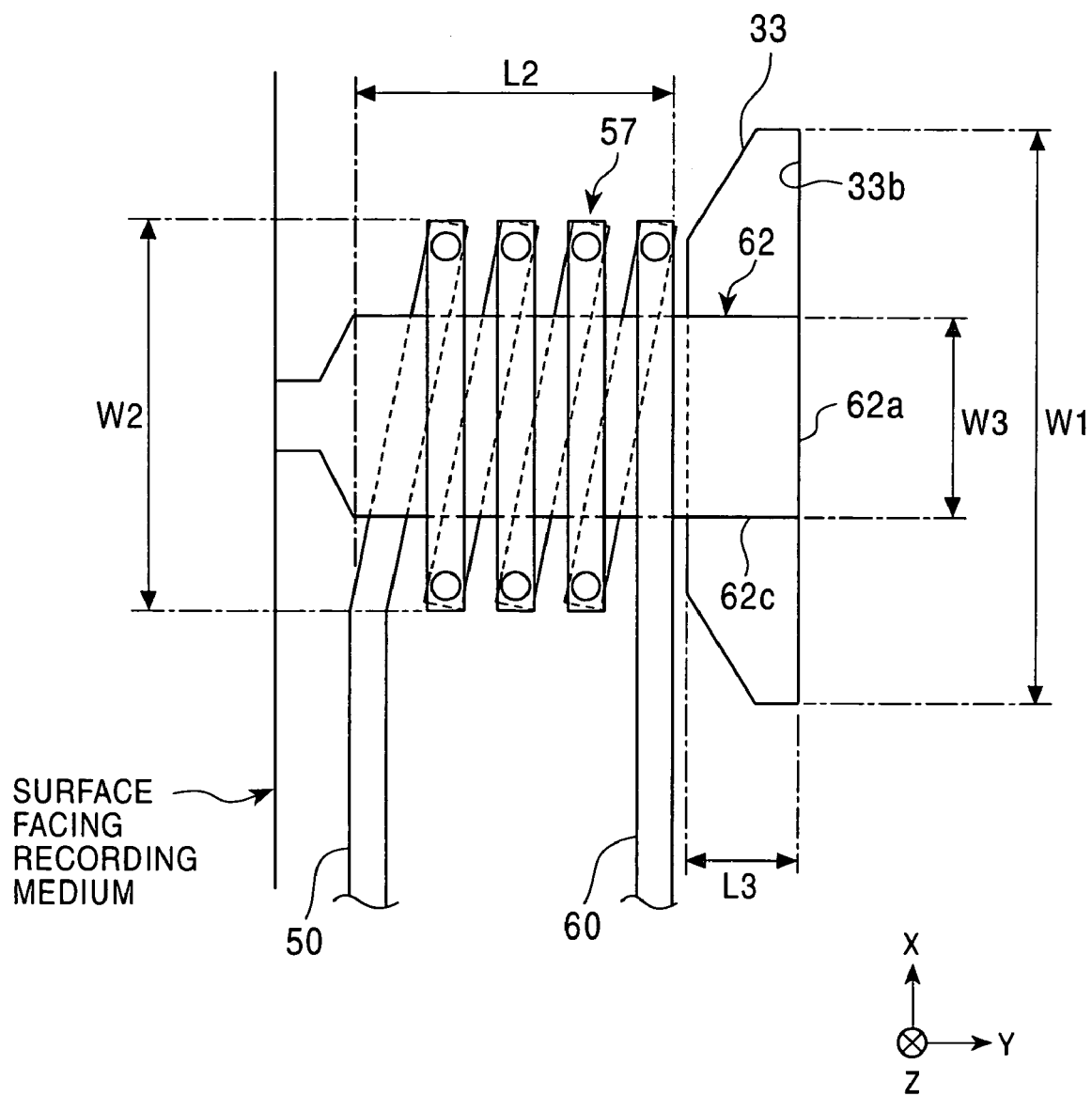
FIG. 9 is a partial plan view of the thin-film magnetic head shown in FIG. 8.
Figure 10:
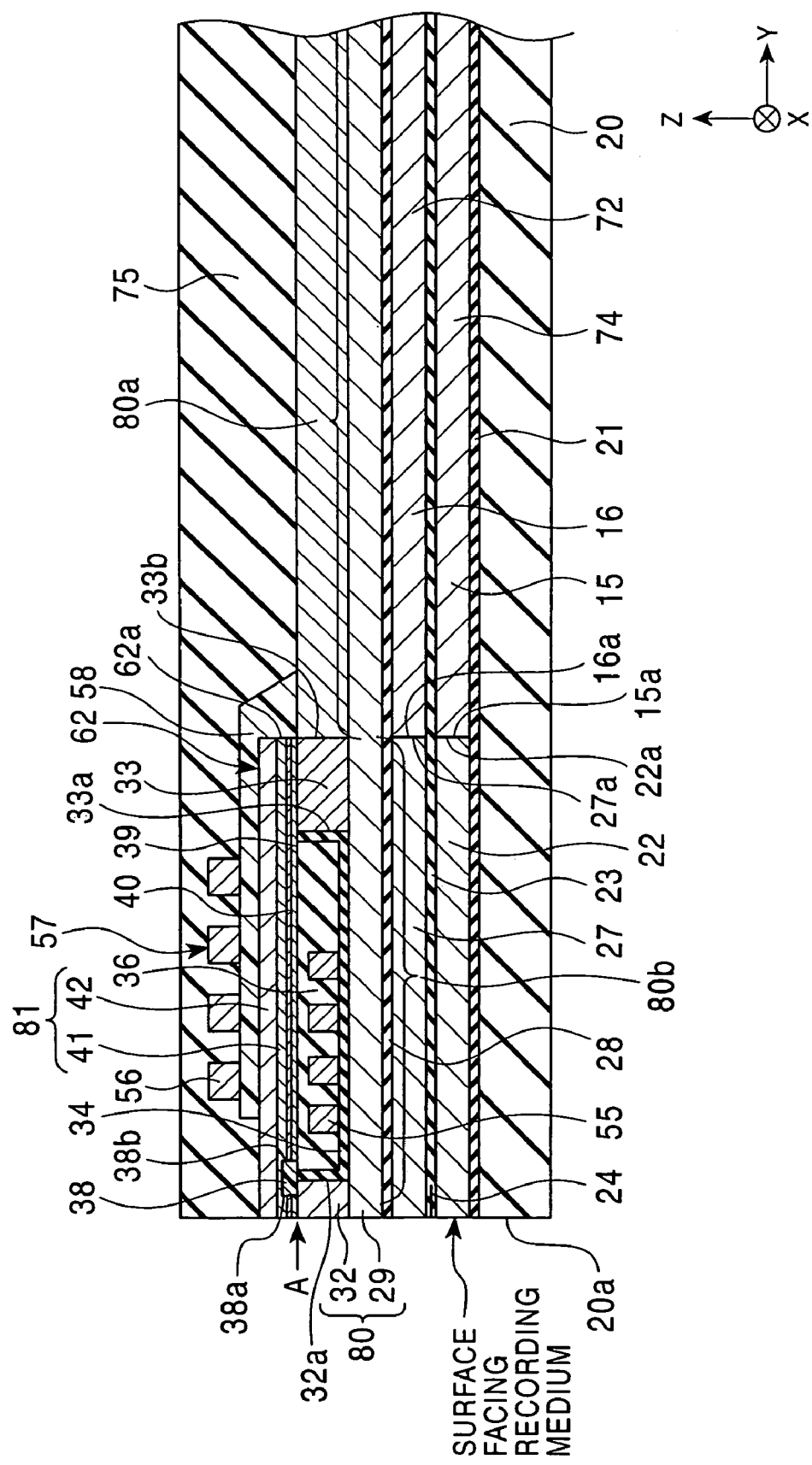
FIG. 10 is a longitudinal sectional view showing a structure of a thin-film magnetic head according to another embodiment of the present invention.
Figure 11:
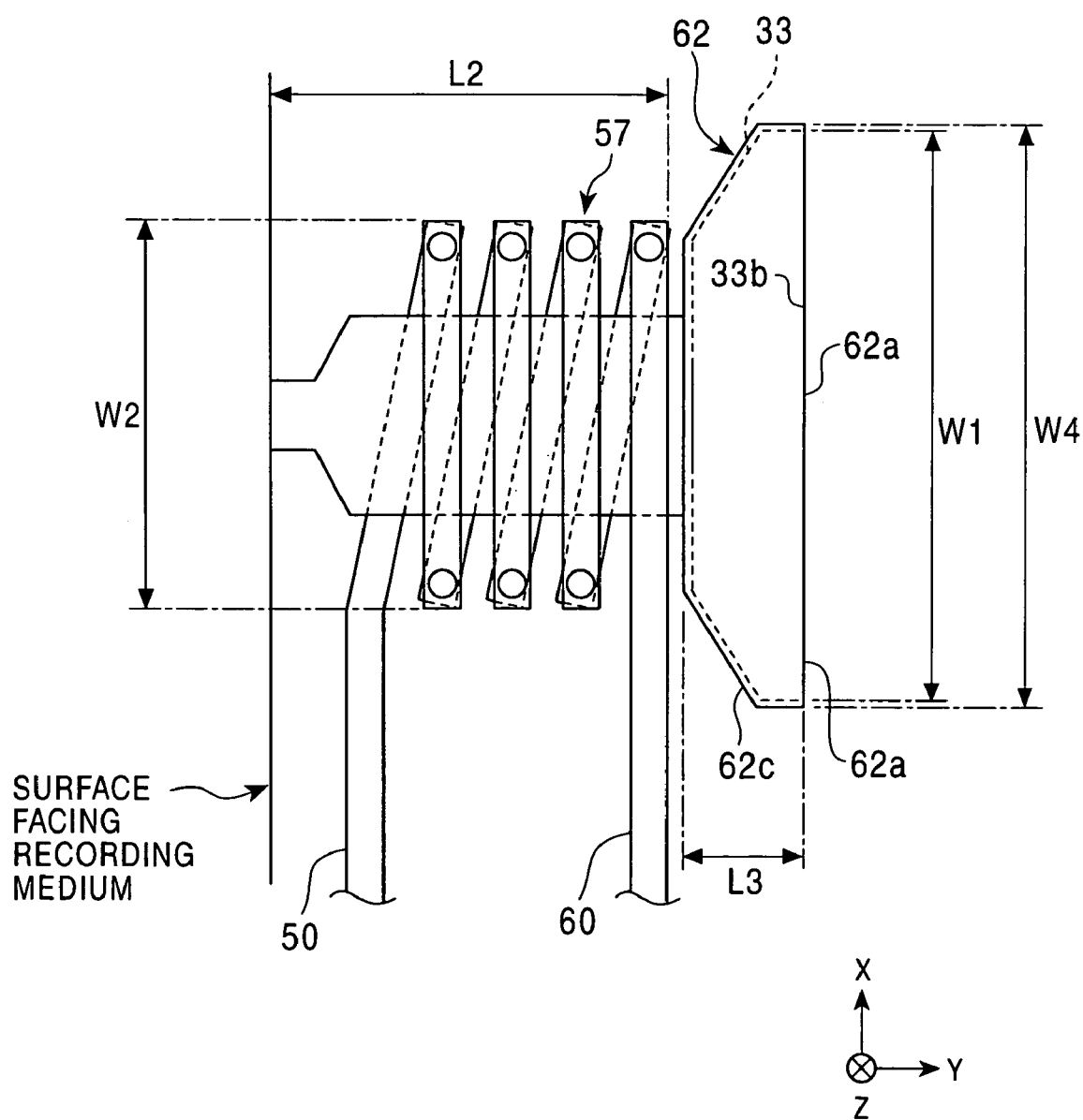
FIG. 11 is a partial plan view of the thin-film magnetic head shown in FIG. 10.

In the embodiment shown in FIG. 9 or 11, as shown in FIG. 8 or 10, the back end 33b of the back gap layer 33 and the back end 22a of the lower shielding layer 22 or the back end 27a of the upper shielding layer 27 are at substantially the same distance from the surface facing the recording medium. However, in the embodiment shown in FIGS. 8 and 9 or FIGS. 10 and 11, the only requirement is that the width W1 of the back gap layer 33 is larger than the width W2 of the toroidal coil layer 57, and the position of the back end 33b of the back gap layer 33 is not limited.

A method for fabricating the thin-film magnetic head 10 shown in FIGS. 2 and 3 will be described with reference to FIGS. 12 to 17 which are longitudinal sectional views showing the fabrication steps.

Figure 12:
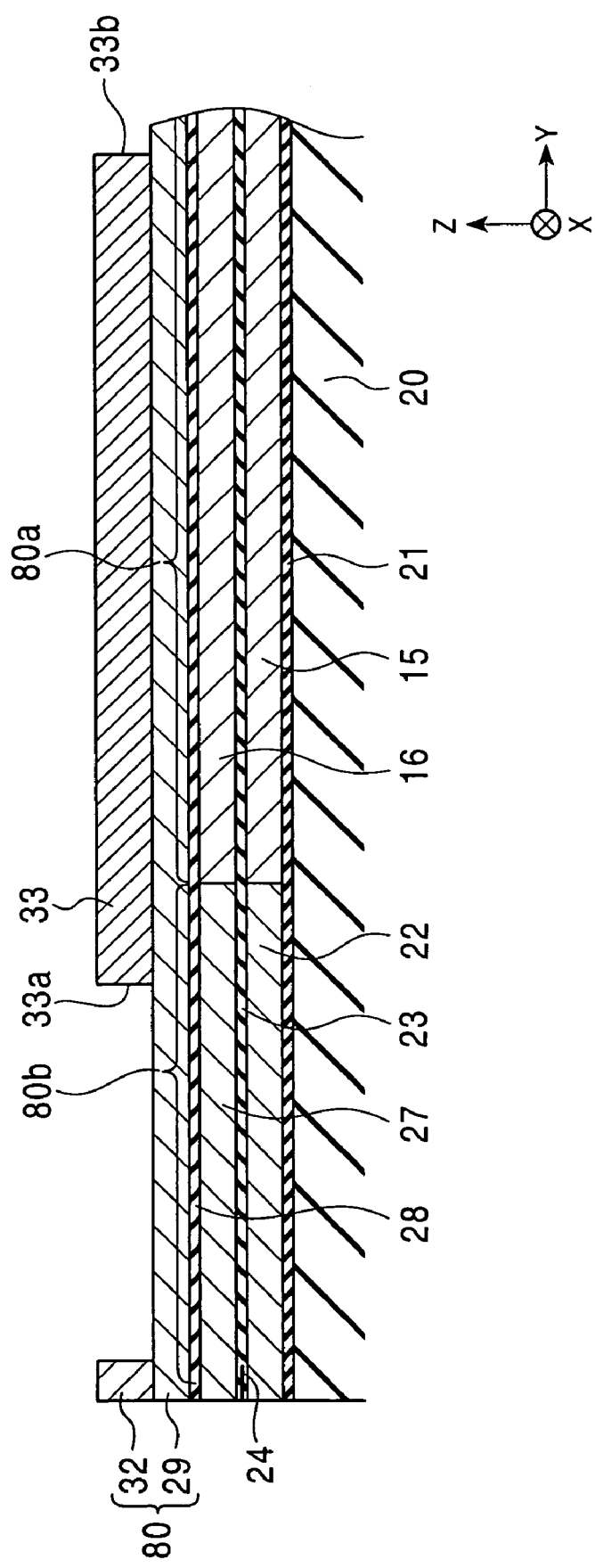
FIG. 12 is a longitudinal sectional view showing a step in a method for fabricating the thin-film magnetic head shown in FIG. 2.

In the step shown in FIG. 12, an $Al_2O_3$ layer 21 is formed on a slider (substrate) 20 composed of alumina-titanium carbide or the like.

A plating underlayer composed of a NiFe alloy or the like (not shown in the drawing) is then formed on the $Al_2O_3$ layer 21 layer by sputtering or vapor deposition. A resist layer (not shown in the drawing) having an opening corresponding to a lower shielding layer 22 to be formed is formed on the plating underlayer by exposure and development. The lower shielding layer 22 is formed by plating in the opening of the resist layer. Similarly, a resist layer (not shown in the drawing) having an opening corresponding to a first metal layer 15 to be formed is formed by exposure and development, and the first metal layer 15 is then formed by plating.

The lower shielding layer 22 and the first metal layer 15 are polished by CMP or the like so that the upper surface of the lower shielding layer 22 and the upper surface of the first metal layer 15 are substantially flush with each other and form a substantially planar surface. Additionally, when the first metal layer 15 is not provided, the lower shielding layer 22 is continuously formed in the space in which the first metal layer 15 is assumed to be formed.

Next, a lower gap layer composed of an inorganic insulating material is formed over the lower shielding layer 22 and the first metal layer 15 by sputtering or vapor deposition. A magnetoresistive element 24 is formed on the lower gap layer in a predetermined region which extends from the surface facing the recording medium in the height direction. An upper gap layer composed of an inorganic insulating material is further formed over the magnetoresistive element 24 and the lower gap layer by sputtering or vapor deposition. The upper gap layer and the lower gap layer constitute a gap layer 23.

An upper shielding layer 27 and a second metal layer 16 are then formed by plating on the gap layer 23 in the same manner as that for the lower shielding layer 22 and the first metal layer 15.

A separation layer 28 composed of an inorganic insulating material, such as $Al_2O_3$ or $SiO_2$, is formed over the upper shielding layer 27 and the second metal layer 16 by sputtering, vapor deposition, or the like.

A lower core layer 29 composed of a NiFe-based alloy or the like is formed on the separation layer 28 by plating. The lower core layer 29 together with an elevation layer 32 which will be described below constitutes a first magnetic core 80. The lower core layer 29 extends in the height direction so as to face the second metal layer 16 in the thickness direction. A region of the lower core layer 29 which faces the second metal layer 16 in the thickness direction corresponds to a back region 80a of the first magnetic core 80, and a region of the lower core layer 29 which lies in front of the back region 80a corresponds to a front region 80b of the first magnetic core 80. The surface of the lower core layer 29 is polished so that a planar surface is obtained.

The elevation layer 32 which together with the lower core layer 29 constitutes the first magnetic core 80 is formed on the lower core layer 29, and a back gap layer 33 is also formed on the lower core layer 29, the back gap layer 33 functioning as a connecting layer for connecting the first magnetic core 80 and a second magnetic core 81 which will be described below to each other. In order to form the elevation layer 32 and the back gap layer 33, patterns for these layers are formed on a resist layer (not shown in the drawing) by exposure and development, and a magnetic material is embedded in the patterns by plating or the like.

At this stage, the back gap layer 33 is formed so that a front end 33a is placed on the front region 80b and a back end 33b is placed on the back region 80a. As shown in FIG. 3, the width W1 of the back gap layer 33 is set to be larger than the width W2 of the toroidal coil layer 57. As shown in FIG. 3, the length L1 is preferably set to be larger than the length L2 of the toroidal coil layer 57.

The resist layer is then removed. Preferably, the upper surface of the elevation layer 32 and the upper surface of the back gap layer 33 are formed so as to be substantially flush with each other.

Figure 13:
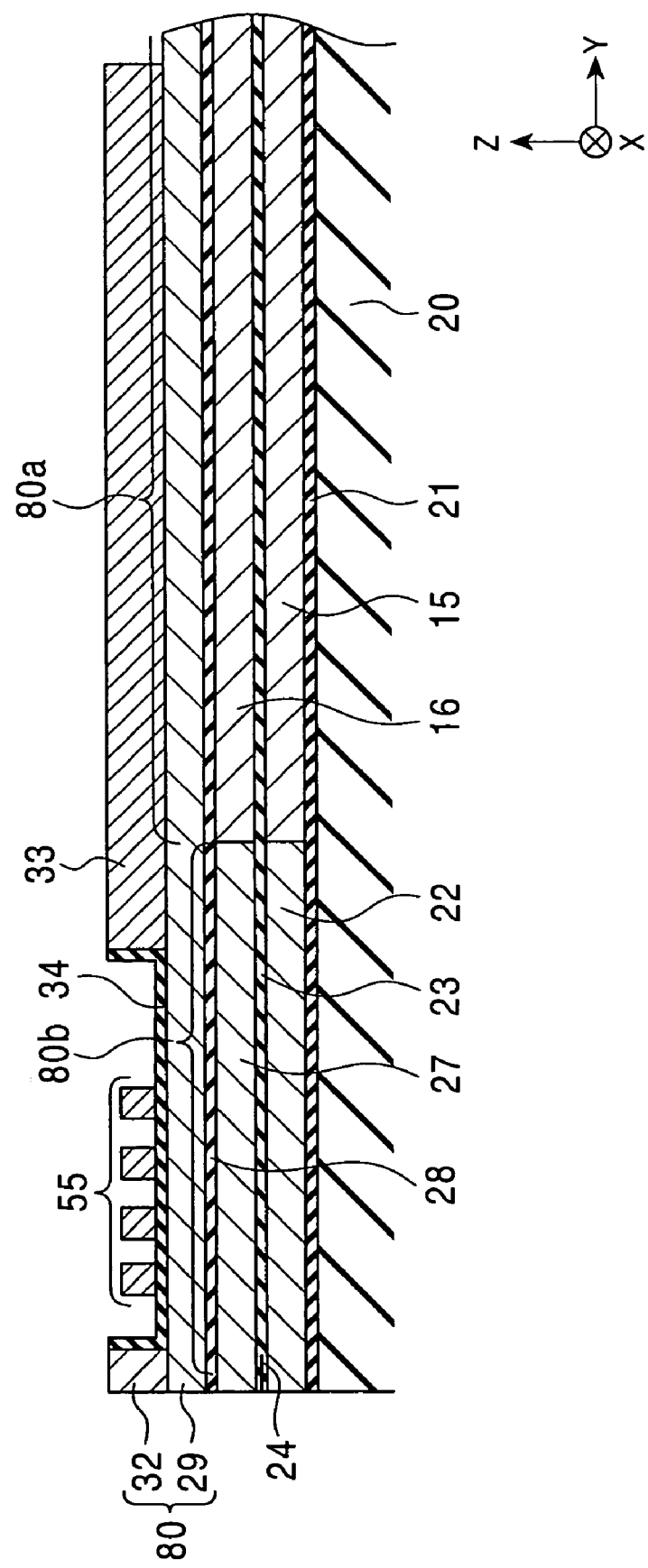
FIG. 13 is a longitudinal sectional view showing a step subsequent to the step shown in FIG. 12.

In the step shown in FIG. 13, a coil-insulating underlayer 34 composed of an insulating material, such as $Al_2O_3$ or $SiO_2$, is formed by sputtering or the like in a space surrounded by the lower core layer 29, the elevation layer 32, and the back gap layer 33. A plurality of first coil strips 55 are formed on the coil-insulating underlayer 34 so as to extend in a direction substantially perpendicular to the height direction. The first coil strips 55 are, for example, formed by plating using at least one metal selected from the group consisting of Au, Ag, Pt, Cu, Cr, Al, Ti, NiP, Mo, Pd, Rh, and Ni. Alternatively, the first coil strips 55 may be formed so as to have a multi-layered structure using these metals. A lead layer 50 shown in FIG. 3 is also formed on the coil-insulating underlayer 34 using the same material as that for the first coil strips 55.

Figure 14:
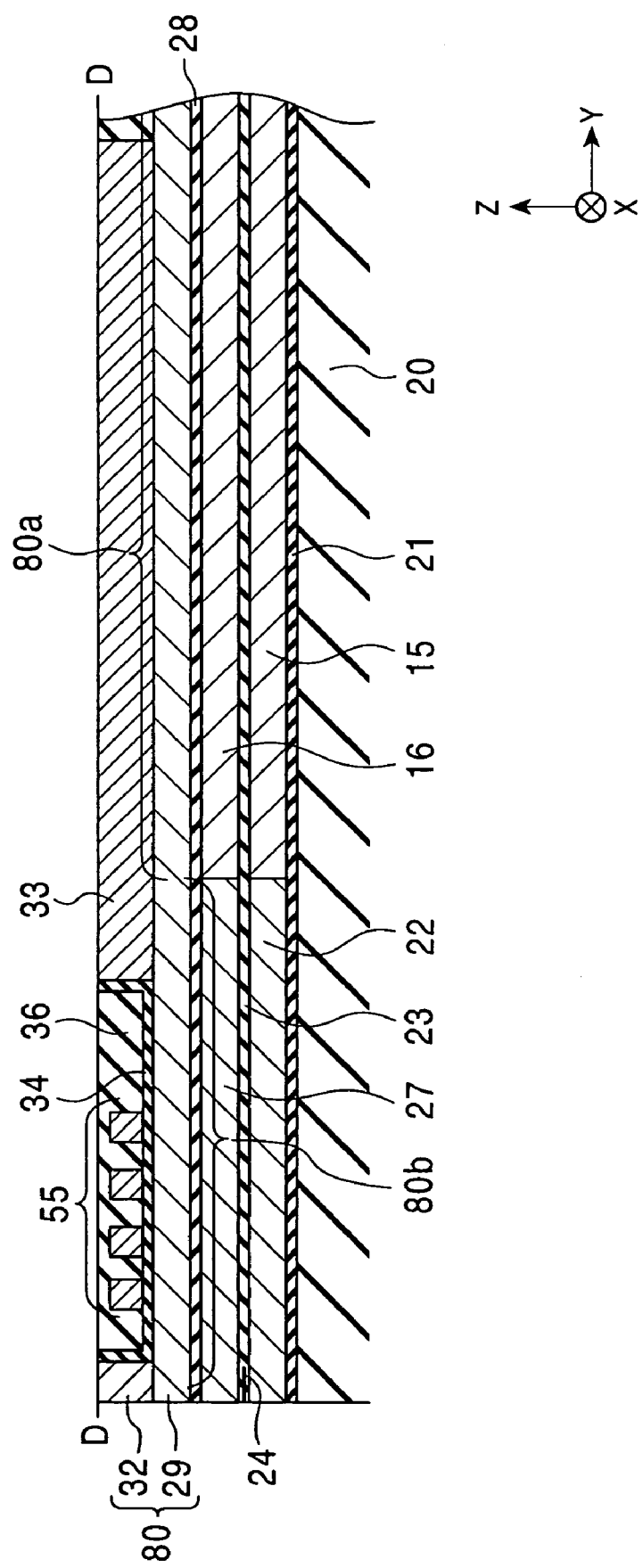
FIG. 14 is a longitudinal sectional view showing a step subsequent to the step shown in FIG. 13.

In the step shown in FIG. 14, a coil-insulating layer 36 composed of $Al_2O_3$ or the like is formed by sputtering or the like so as to fill the spaces between the first coil strips 55 and on the elevation layer 32 and the back gap layer 33.

The coil-insulating layer 36 is then polished to the line D-D of FIG. 14 by CMP or the like parallel to the X-Y plane.

Figure 15:
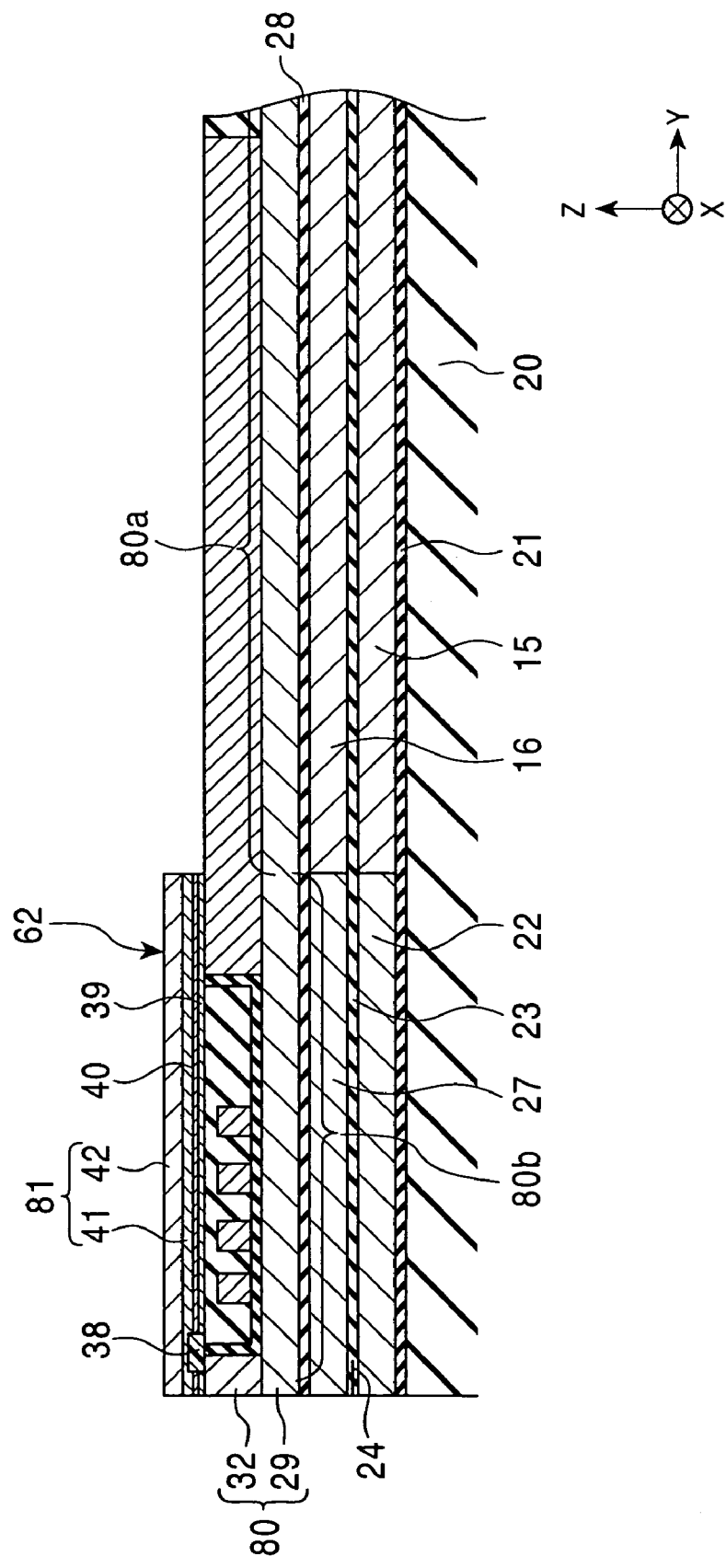
FIG. 15 is a longitudinal sectional view showing a step subsequent to the step shown in FIG. 14.

In the step shown in FIG. 15, a Gd-defining layer 38 is formed so as to extend from a position at a predetermined distance from the surface facing the recording medium in the height direction (in the Y direction). A plating underlayer (not shown in the drawing) is then formed on a region excluding the Gd-defining layer 38, and a lower pole layer 39, a gap layer 40, an upper pole layer 41, and an upper core layer 42 are continuously formed by plating.

The upper pole layer 41 and the upper core layer 42 constitute a second magnetic core 81. As shown in FIG. 15, at the back of the Gd-defining layer 38 in the height direction, since the lower pole layer 39 and the gap layer 40 are disposed between the second magnetic core 81 and the back gap layer 33, the first magnetic core 80 and the second magnetic core 81 are connected to each other via the lower pole layer 39, the gap layer 40, and the back gap layer 33 functioning as the connecting layer. However, the lower pole layer 39 and the gap layer 40 may be omitted at the back of the Gd-defining layer 38 in the height direction, and in such a case, the first magnetic core 80 and the second magnetic core 81 are connected to each other via the back gap layer 33.

The four layers from the lower pole layer 39 to the upper core layer 42 constitute a magnetic pole layer 62. However, in the present invention, the lower pole layer 39 may be omitted at the opposite side (the surface facing recording medium side) to the height side of the Gd-defining layer 38. If the lower pole layer 39 is provided, it becomes possible to narrow the gap.

Figure 16:
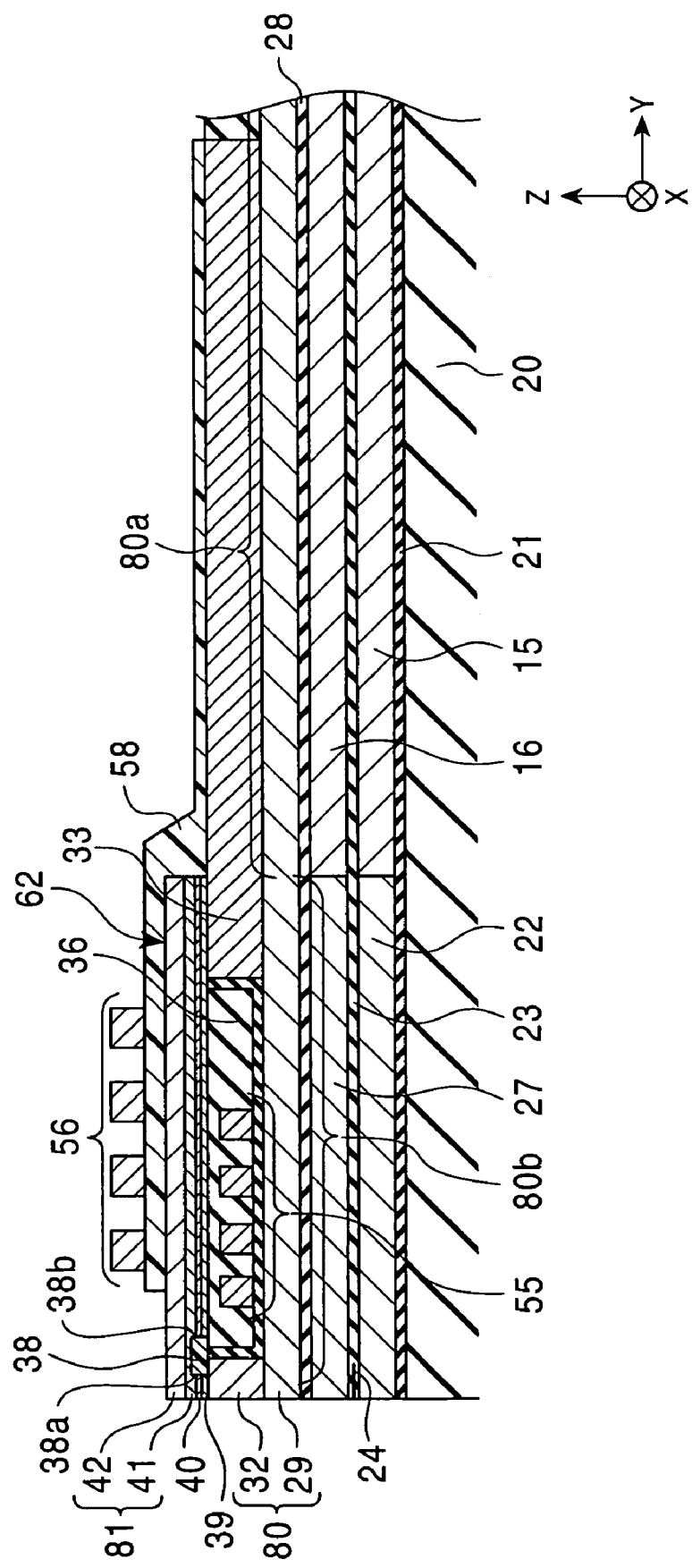
FIG. 16 is a longitudinal sectional view showing a step subsequent to the step shown in FIG. 15.

In the step shown in FIG. 16, an insulating layer 58 is formed over the upper core layer 42 and the back gap layer 33 in the region not covered by the lower pole layer 39.

Next, a plurality of second coil strips 56 are formed on the insulating layer 58 so as to traverse the magnetic pole layer 62. The second coil strips 56 are, for example, formed by plating using at least one metal selected from the group consisting of Au, Ag, Pt, Cu, Cr, Al, Ti, NiP, Mo, Pd, Rh, and Ni. Alternatively, the second coil strips 56 may be formed so as to have a multi-layered structure using these metals. At this stage, a lead layer 60 shown in FIG. 3 is also formed.

When the second coil strips 56 are formed, as shown in FIG. 3, the joints 55a of the first coil strips 55 and the joints 56a of the second coil strips 56 facing each other in the Z direction are connected, and the joints 55b of the first coil strips 55 and the joints 56b of the second coil strips 56 are connected. A toroidal coil layer 57 is thereby formed.

A protective layer 75 composed of $Al_2O_3$ is then formed as shown in FIG. 17. The thin-film magnetic head 10 is thereby fabricated.

In order to fabricate the thin-film magnetic head 100 shown in FIGS. 4 and 5, in the step shown in FIG. 15, the lower pole layer 39 and the gap layer 40 are extended so as to face the back region 80a of the lower core layer 29 in the thickness direction. The second magnetic core 81 is also extended in the height direction to form the back region 81a so as to face the back region 80a in the thickness direction. The back region 62c of the magnetic pole layer 62 is thereby formed. The upper surface of the back gap layer 33 is covered by the back region 62c of the magnetic pole layer 62 formed on the back gap layer 33. That is, as shown in FIG. 18, the back end 62a in the height direction of the magnetic pole layer 62 and the back end 33b of the back gap layer 33 are set at substantially the same distance from the surface facing the recording medium as also shown in FIG. 5. As shown in FIG. 5, the width W4 of the magnetic pole layer 62 is set to be larger than the width W1 of the back gap layer 33. The width W4 of the magnetic pole layer 62 may be set to be the same as the width W1 of the back gap layer 33.

In order to fabricate the thin-film magnetic head according to the embodiment shown in FIG. 6, in the step shown in FIG. 12, the maximum width W5 of the back gap layer 33 is set to be smaller than the width W2 of the toroidal coil layer 57.

In order to fabricate the thin-film magnetic head according to the embodiment shown in FIG. 7, in the step shown in FIG. 12, the maximum width W5 of the back gap layer 33 is set to be smaller than the width W2 of the toroidal coil layer 57. In the step shown in FIG. 15, when the magnetic pole layer 62 is formed, the lower pole layer 39 and the gap layer 40 are extended so as to face the back region 80a of the lower core layer 29 in the thickness direction, and the second magnetic core 81 is formed so as to face the back region 80a in the thickness direction to form the back region 81a. Thereby, the back region 62c of the magnetic pole layer 62 is formed. As shown in FIG. 7, the back end 62a of the magnetic pole layer 62 and the back end 33b of the back gap layer 33 are set at substantially the same distance from the surface facing the recording medium. As shown in FIG. 7, the width W3 of the magnetic pole layer 62 is set to be larger than the width W5 of the back gap layer 33.

In order to fabricate the thin-film magnetic head according to the embodiment shown in FIGS. 8 and 9, in the step shown in FIG. 12, as shown in FIG. 9, the maximum width W1 of the back gap layer 33 is set to be larger than the maximum width W2 of the toroidal coil layer 57, and the maximum length L3 of the back gap layer 33 is set to be smaller than the length L2 of the toroidal coil layer 57.

In order to fabricate the thin-film magnetic head according to the embodiment shown in FIGS. 10 and 11, in the step shown in FIG. 12, as shown in FIG. 11, the maximum width W1 of the back gap layer 33 is set to be larger than the maximum width W2 of the toroidal coil layer 57, and the maximum length L3 of the back gap layer 33 is set to be smaller than the length L2 of the toroidal coil layer 57. In the step shown in FIG. 15, when the magnetic pole layer 62 is formed, as shown in FIG. 11, the back end 62a in the height direction of the magnetic pole layer 62 and the back end 33b of the back gap layer 33 are set at substantially the same distance from the surface facing the recording medium.

The thin-film magnetic head of the present invention is not limited to the embodiments described above. For example, the elevation layer 32 of the first magnetic core 80 may be omitted.

The thin-film magnetic head of the present invention is, for example, built in a magnetic head unit mounted on a hard disk device. The thin-film magnetic head may be built in a floating-type magnetic head unit or a contact-type magnetic head unit. It is also possible to use the thin-film magnetic head for a magnetic sensor, etc.

As described above, in the thin-film magnetic head of the present invention, since the heat capacity of the back gap layer which connects the first magnetic core and the second magnetic core can be increased, heat due to an eddy current generated in the second magnetic core, Joule heat generated in the toroidal coil layer, and in particular, heat generated in the coil layer and in the vicinity of the surface facing the recording medium can be easily dissipated through the connecting layer. Consequently, it is possible to prevent pole tip protrusion (PTP) from being caused by heat generated in the vicinity of the surface facing the recording medium.

Since the connecting layer extends so as to face the second metal layer at the back in the height direction of the upper pole layer, it is possible to transmit heat in the vicinity of the surface facing the recording medium to a region apart from the surface facing the recording medium. Consequently, it is possible to easily prevent PTP from being caused by heat generated in the vicinity of the surface facing the recording medium.

What is claimed is:

1. A thin-film magnetic head comprising:
   a first magnetic core extending in a height direction from a surface facing a recording medium;
   a second magnetic core disposed above the first magnetic core, the second magnetic core facing the first magnetic core with a gap layer therebetween at the surface facing the recording medium, the second magnetic core being connected to the first magnetic core with a connecting layer at a back side in the height direction;
   a toroidal coil layer comprising a plurality of first coil strips provided in a space surrounded by the first magnetic core and the second magnetic core and a plurality of second coil strips provided above the second magnetic core, the plurality of first coil strips and the plurality of second coil strips being electrically connected to each other and being wound around the second magnetic core;
   a read head section comprising a shielding layer and a magnetoresistive element; and
   a metal layer extending at a back of the shielding layer in the height direction,
   wherein the connecting layer extends in the height direction so as to face the metal layer in a thickness direction, a length of the connecting layer is larger than a length of the toroidal coil layer, a width in a track width direction of the connecting layer is larger than a width in the track width direction of the toroidal coil layer, the first magnetic core includes a back region that extends in the height direction so as to face the metal layer in the thickness direction, the connecting layer is disposed on the back region, and the metal layer, the back region of the first magnetic core, and the connecting layer face each other in the thickness direction.

2. The thin-film magnetic head according to claim 1, wherein the second magnetic core includes a back region which extends in the height direction so as to face the back region of the first magnetic core.

3. The thin-film magnetic head according to claim 2, wherein the back region of the first magnetic core, the connecting layer, and the back region of the second magnetic core are disposed in that order on the metal layer.

4. The thin-film magnetic head according to claim 3, wherein the metal layer, the back region of the first magnetic core, the connecting layer, and the back region of the second magnetic core face each other in the thickness direction.

5. The thin-film magnetic head according to claim 1, wherein the shielding layer comprises an upper shielding layer disposed on the magnetoresistive element, the metal layer is disposed at a back in the height direction of the upper shielding layer, and the back region of the first magnetic core is in contact with the metal layer.

6. The thin-film magnetic head according to claim 1, wherein the first magnetic core comprises a lower core layer extending from the surface facing the magnetic medium in the height direction and an elevation layer extending from the surface facing the magnetic medium in the height direction with a predetermined length, and the second magnetic core is disposed on the elevation layer with the gap layer therebetween.

7. The thin-film magnetic head according to claim 1, wherein the second magnetic core comprises an upper pole layer and an upper core layer disposed thereon.

* * * * *